US008467624B2

(12) United States Patent
Son

(10) Patent No.: US 8,467,624 B2
(45) Date of Patent: Jun. 18, 2013

(54) IMAGE PROCESSING APPARATUS, IMAGE PROCESSING CIRCUIT, AND IMAGE PROCESSING METHOD

(75) Inventor: Sho Son, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1444 days.

(21) Appl. No.: 12/115,318

(22) Filed: May 5, 2008

(65) Prior Publication Data

US 2008/0279463 A1    Nov. 13, 2008

(30) Foreign Application Priority Data

May 8, 2007  (JP) ................................ 2007-123633

(51) Int. Cl.
*G06K 9/36* (2006.01)

(52) U.S. Cl.
USPC ....................................................... 382/248

(58) Field of Classification Search
None
See application file for complete search history.

(56) References Cited

U.S. PATENT DOCUMENTS

| 6,492,916 | B1 * | 12/2002 | Schwartz et al. | 341/59 |
| 6,570,510 | B2 * | 5/2003 | Chen et al. | 341/51 |
| 6,577,251 | B1 * | 6/2003 | Yip | 341/50 |
| 6,778,709 | B1 * | 8/2004 | Taubman | 382/240 |
| 7,421,136 | B2 * | 9/2008 | Sirohey et al. | 382/240 |
| 7,457,473 | B2 * | 11/2008 | Schwartz et al. | 382/240 |
| 7,505,629 | B2 * | 3/2009 | Kadowaki | 382/232 |
| 7,660,469 | B2 * | 2/2010 | Katayama | 382/232 |
| 7,831,103 | B2 * | 11/2010 | Mahiar et al. | 382/239 |
| 2002/0044696 | A1 * | 4/2002 | Sirohey et al. | 382/240 |
| 2003/0128878 | A1 * | 7/2003 | Leannec et al. | 382/233 |
| 2005/0036701 | A1 | 2/2005 | Miyazawa et al. | |
| 2007/0071332 | A1 * | 3/2007 | Katayama | 382/233 |

FOREIGN PATENT DOCUMENTS

| JP | 2004-227406 | 8/2004 |
| JP | 2004-254298 | 9/2004 |
| JP | 2006-287485 | 10/2006 |

* cited by examiner

*Primary Examiner* — Chan S Park
*Assistant Examiner* — Sean Motsinger
(74) *Attorney, Agent, or Firm* — Dickstein Shapiro LLP

(57) ABSTRACT

A disclosed image processing apparatus divides an image into code-blocks of different levels by a wavelet transform, generates information codes of code-block-related information items related to the code-blocks of the different levels using separate tag trees corresponding to the different levels, and generates code data in which the image is encoded. The image processing apparatus comprises a coordinate generating unit that generates an x coordinate and a y coordinate of each of the code-blocks of each of the levels wherein a unit in an x direction and in a y direction is defined by a size of the individual code-blocks of the corresponding level; and an address generating unit that generates a multiple so a combination value of a bit combination of the y coordinate and the x coordinate of each code-block as an address for storing the information code of the code-block in a first storage unit.

19 Claims, 22 Drawing Sheets

FIG.3
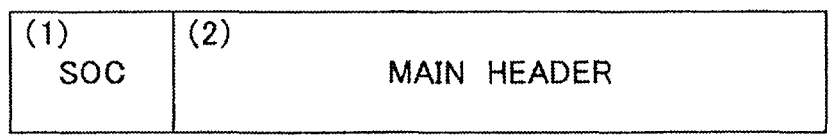
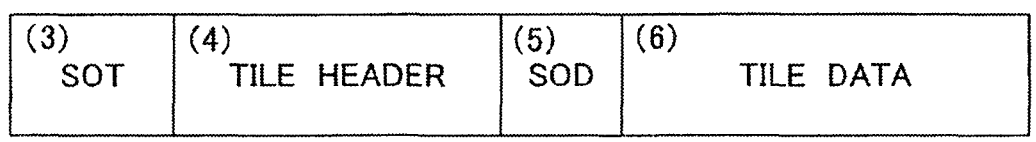
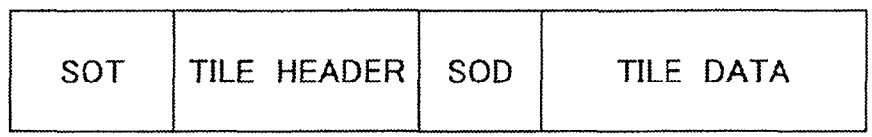
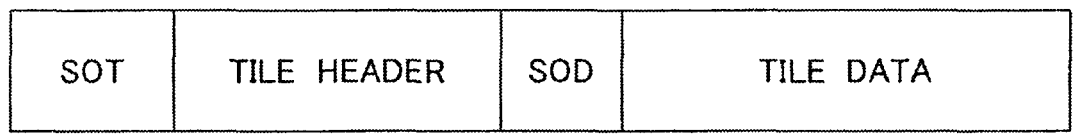
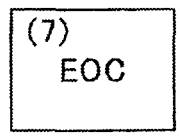

1 : ZERO LENGTH PACKET
2 : CODE-BLOCK INCLUSION
3 : ZERO BIT-PLANE INFORMATION
4 : NUMBER OF CODING PASSES
5 : L BLOCK
6 : CODE-BLOCK DATA LENGTH
7 : ZERO STUFFING
8 : PACKET DATA

```
rb_ti1 = Pre_ok ?
         (Pre_size ?  8'b0,cb_y_cnt[2:1],cb_x_cnt[2:1] :    10'b0,cb_y_cnt[1],cb_x_cnt[1] ) :
           (level1 ?  cb_y_cnt[6:1],cb_x_cnt[6:1] :
            level2 ?  2'b0,cb_y_cnt[5:1],cb_x_cnt[5:1] :
            level3 ?  4'b0,cb_y_cnt[4:1],cb_x_cnt[4:1] :
            level4 ?  6'b0,cb_y_cnt[3:1],cb_x_cnt[3:1] :
            level5 ?  8'b0,cb_y_cnt[2:1],cb_x_cnt[2:1] :
            level6 ? 10'b0,cb_y_cnt[1],cb_x_cnt[1] : 0 );

rb_zi1 = Pre_ok ?
         (Pre_size ?  8'b0,cb_y_cnt[2:1],cb_x_cnt[2:1] :    10'b0,cb_y_cnt[1],cb_x_cnt[1] ) :
           (level1 ?  cb_y_cnt[6:1],cb_x_cnt[6:1] :
            level2 ?  2'b0,cb_y_cnt[5:1],cb_x_cnt[5:1] :
            level3 ?  4'b0,cb_y_cnt[4:1],cb_x_cnt[4:1] :
            level4 ?  6'b0,cb_y_cnt[3:1],cb_x_cnt[3:1] :
            level5 ?  8'b0,cb_y_cnt[2:1],cb_x_cnt[2:1] :
            level6 ? 10'b0,cb_y_cnt[1],cb_x_cnt[1] : 0 );

rb_zn1 = Pre_ok ? (Pre_size ?
         8'b0,cb_y_cnt[2:1],cb_x_cnt[2:1],2'b0 :   10'b0,cb_y_cnt[1],cb_x_cnt[1],2'b0 ) :
           (level1 ?  cb_y_cnt[6:1],cb_x_cnt[6:1],2'b0 :
            level2 ?  2'b0,cb_y_cnt[5:1],cb_x_cnt[5:1],2'b0 :
            level3 ?  4'b0,cb_y_cnt[4:1],cb_x_cnt[4:1],2'b0 :
            level4 ?  6'b0,cb_y_cnt[3:1],cb_x_cnt[3:1],2'b0 :
            level5 ?  8'b0,cb_y_cnt[2:1],cb_x_cnt[2:1],2'b0 :
            level6 ? 10'b0,cb_y_cnt[1],cb_x_cnt[1],2'b0 : 0 );
```

$$matwti3 = (packet\_hd \ \& \ r3\_enb \ \& \ T3ucd) \ ?$$
$$((bn\_ti3=31 \ \& \ bn\_ti2=31 \ \& \ bn\_ti1=31 \ \& \ bn\_ti0=31) \ ) : 0; \quad \cdots (1)$$

$$matrti3 = lay\_first \ ? \ ((((packet\_hd \ \& \ r3\_enb \ \& \ !T3ucd) \ | \ (packet\_dt \ \& \ r3\_enb)) \ ?$$
$$((bn\_ti3=0 \ \& \ bn\_ti2=0 \ \& \ bn\_ti1=0 \ \& \ bn\_ti0=0)) : 0) : \quad \cdots (2)$$
$$((((packet\_hd \ | \ packet\_dt) \ \& \ r3\_enb) \ ?$$
$$((bn\_ti3=0 \ \& \ bn\_ti2=0 \ \& \ bn\_ti1=0 \ \& \ bn\_ti0=0)) : 0) ;$$

FIG.17 matwzi3 = (packet_hd & r3_enb) ?
((bn_zi3=31 & bn_zi2=31 & bn_zi1=31 & bn_zi0=31)) : 0;   ...(3)

matrzi3 = lay_first ? ((((packet_hd &  r3_enb & !T3ucd) | (packet_dt & r3_enb)) ?
((bn_zi3=0 & bn_zi2=0 & bn_zi1=0 & bn_zi0=0)) : 0) :   ...(4)
(((packet_hd | packet_dt) & r3_enb) ?
((bn_zi3=0 &  bn_zi2=0 & bn_zi1=0 & bn_zi0=0)) : 0) ;

FIG.19 matwzn3 = (packet_hd & r3_enb ) ?
((bn_zn3=28 & bn_zn2=28 & bn_zn1=28 & bn_zn0=28)) : 0;   ...(5)

matrzn3 = lay_first ? (((packet_hd & r3_enb & !T3ucd) | (packet_dt & r3_enb)) ?
((bn_zn3=0 & bn_zn2=0 & bn_zn1=0 & bn_zn0=0)) : 0) :   ...(6)
(((packet_hd | packet_dt) & r3_enb ) ?
((bn_zn3=0 & bn_zn2=0 & bn_zn1=0 & bn_zn0=0)) : 0) ;

FIG.22

| | | |
|---|---|---|
| L8 | cb : 1 x 1 | siz : 32 x 32 |
| L7 | cb : 2 x 2 | siz : 64 x 64 |
| L6 | cb : 4 x 4 | siz : 128 x 128 |
| L5 | cb : 8 x 8 | siz : 256 x 256 |
| L4 | cb : 16 x 16 | siz : 512 x 512 |
| L3 | cb : 32 x 32 | siz : 1024 x 1024 |

L1
cb : 128 x 128
siz : 4096 x 4096

L2
cb : 64 x 64
siz : 2048 x 2048

IMAGE PROCESSING APPARATUS, IMAGE PROCESSING CIRCUIT, AND IMAGE PROCESSING METHOD

BACKGROUND OF THE INVENTION

1. Field of the Invention

The present invention relates to an image processing apparatus, an image processing circuit, and an image processing method.

2. Description of the Related Art

In image encoding and decoding based on wavelet transform, various codes of information including transform coefficients are present in every level of sub-band decomposition. Some image processing apparatuses have been known that efficiently load these codes into memories and provide easy access to the codes.

For example, Japanese Patent Laid-Open Publication No. 2006-297485 (Patent Document 1) discloses an image processing apparatus that varies the size of memory space to be allocated for storing one unit of data according to the bit depth of the data, which data are created by at least one processing step, thereby improving memory utilization efficiency.

As another example, Japanese Patent Laid-Open Publication No. 2004-254298 (Patent Document 2) discloses an image processing apparatus that includes a distributed storage unit that stores compressed codes of different levels in a distributed fashion, thereby enabling high-speed processing.

In the encoding scheme of JPEG 2000, information items related to code-blocks, each including a set of transform coefficients, in different levels are encoded using a tree structure called a tag tree. In the tag tree structure, if a first code-block has the same parent code-block as a second code-block, the code for the tag level can be omitted in the second code-block, thereby enabling efficient encoding.

However, in encoding and decoding processes using such a tag tree structure, when processing one code-block, it is necessary to hold codes in all the tag levels from the immediately higher (parent) level to the route level.

Take an example in which code-blocks in the top row (a first code-block line) in a set of two-dimensionally arranged code-blocks are processed from left to right (in the x direction) and, after completion of the processing of the first code-block line, code-blocks in the next row in the y direction (a second code-block line below the first code-block line) are processed. In this case, after the code-block at the left end of the first code-block line is processed, codes in all the parent tag levels of this code-block need to be held until the processing of the code-blocks of the second row is started.

Holding the codes of all the tag levels is not a serious problem as long as the resolution of an image is low. However, in the case of a high resolution image, a large memory capacity is required for holding the codes of all the tag levels, resulting in increasing the cost of an image processing apparatus for processing the image.

If, in order to avoid such a problem, the codes of all the tag levels are loaded into an external memory and reading and writing are performed as needed, processing steps are increased due to frequent access to the external memory, resulting in reducing the overall processing speed. Furthermore, in the case where an LSI is used for performing these operations, the increased number of accesses to the external memory leads to increased power use.

Therefore the codes need to be properly loaded into, for example, a memory that can be accessed at high speed and an external memory having a large capacity according to the progress of the processing of the code-blocks of the image, but such a control technique is not used in the image processing apparatuses of Patent Documents 1 and 2.

SUMMARY OF THE INVENTION

In view of the foregoing, the present invention is directed to provide an image processing apparatus capable of properly controlling addresses for storing information codes encoded using a tag tree structure.

In an embodiment of the present invention, there is provided an image processing apparatus that divides an image into code-blocks of different levels by a wavelet transform, generates information codes of code-block-related information items related to the code-blocks of the different levels using separate tag trees corresponding to the different levels, and generates code data in which the image is encoded. The image processing apparatus comprises a coordinate generating unit that generates an x coordinate and a y coordinate of each of the code-blocks of each of the levels wherein a unit in an x direction and in a y direction is defined by the size of the individual code-blocks of the corresponding level; and an address generating unit that generates a multiple of a combination value of a bit combination of the y coordinate and the x coordinate of each code-block as an address for storing the information code of the code-block in a first storage unit.

With this configuration, the image processing apparatus can encode an image while properly controlling addresses for storing the information codes encoded in a tag tree structure.

In an embodiment of the present invention, there is provided an image processing apparatus that generates an image by decoding Information codes of code-block-related information items from code data in which the image is encoded, the information codes being related to code-blocks of different levels into which the image has been divided by a wavelet transform and being generated using separate tag trees corresponding to the different levels. The image processing apparatus comprises a coordinate generating unit that generates an x coordinate and a y coordinate of each of the code-blocks of each of the levels wherein a unit in an x direction and in a y direction is defined by a size of the individual code-blocks of the corresponding level; and an address generating unit that generates a multiple of a combination value of a bit combination of the y coordinate and the x coordinate of each code-block as an address for storing the information code of the code-block in a first storage unit.

With this configuration, the image processing apparatus can encode an image while properly controlling addresses for storing the information codes encoded in a tag tree structure.

In the above-described image processing apparatuses, the multiple of the combination value may preferably be calculated by multiplying the combination value by a maximum bit length of the information code for each of the different information codes.

With this configuration, the address can be properly generated according to the bit length of the information code.

In the above-described image processing apparatus, in the case of performing reading and/or writing a first predetermined number of consecutive bits at a time, the address generating unit may preferably use values of higher order bits of the multiple of the combination value from which the same number of lower order bits as the number of the first predetermined number of consecutive bits are removed as an offset value for reading the information code from or writing the information code into the first storage unit.

With this configuration, the image processing apparatus can properly generate addresses for storing the information codes in the first storage unit.

In the above-described image processing apparatus, the address generating unit may preferably generate a second predetermined number of lower order bits of the multiple of the combination value as an address of the information code in a second storage unit that has a lower capacity than the first storage unit.

With this configuration, the image processing apparatus can properly generate addresses for storing the information codes in the second storage unit.

In the above-described storage unit, the first predetermined number may be the same number as the second predetermined number.

With this configuration, the information codes can be efficiently transferred between the first and second storage units.

The above-described image processing apparatus may further comprise a storage control unit that, when the address of the information code in the second storage unit has a first predetermined value, reads the information code from the first storage unit and writes the information code into the second storage unit and, when the address of the information code in the second storage unit has a second predetermined value, reads the information code from the second storage unit and writes the information code into the first storage unit.

This configuration can reduce the number of access times to the first storage unit.

In the above-described image processing unit, the first storage unit may preferably be disposed outside the image processing apparatus and the second storage unit may preferably be disposed inside the image processing apparatus.

With this configuration, it is possible to properly use the storage unit outside the image processing apparatus and the storage unit inside the image processing apparatus.

In an embodiment of the present invention, there is provided an image processing circuit that includes the units of one of the above-described image processing apparatuses.

In an embodiment of the present invention, there is provided an image processing method that executes functions of the units of one of the above-described image processing apparatuses.

According to an aspect of the present invention, an image processing apparatus can be provided that is capable of properly controlling addresses for storing information codes encoded in a tag tree structure.

BRIEF DESCRIPTION OF THE DRAWINGS

FIG. 3 is a diagram showing an example of the configuration of code data;

FIG. 13 shows an example of a description of a register transfer level in a hardware description language for realizing address generation;

FIG. 15 shows an example of a description of determination of the timing for loading code-block inclusion information in a hardware description language;

FIG. 17 shows an example of a description of determination of timing for loading zero bit-plane inclusion information in a hardware description language;

FIG. 19 shows an example of a description in a hardware description language for determination of timing for loading zero bit-plane information;

FIG. 22 is a diagram illustrating the code-blocks of different resolution levels resulting from sub-band decompositions.

DETAILED DESCRIPTION OF THE PREFERRED EMBODIMENT

In order to facilitate understanding of the present invention, the process of image encoding/decoding using a tag tree is explained before describing the preferred embodiments of the present invention.

(The Process of Image Encoding in JPEG 2000)

Figure 1:
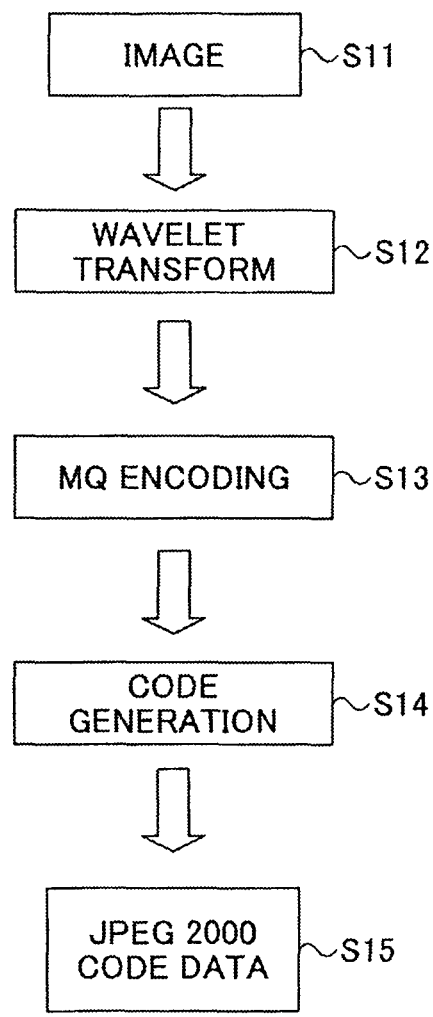
FIG. 1 is a flowchart illustrating the process of image encoding in JPEG 2000.

FIG. 1 is a flowchart illustrating the process of image encoding in JPEG 2000. As shown in FIG. 1, several processing operations are performed sequentially on an image, thereby generating JPEG 2000 code data. In Step S11 of FIG. 1, image data are input into an apparatus that performs image processing. In this Step 11, if the image data comprise plural color components, the image data may be divided by the color of the color components. Further, processing such as color space transform and a level shift for adding predetermined values to predetermined pixel values may be performed. The image data may be further split into rectangular regions called "tiles".

Then in Step S12, the image data or the tiles of the image data are wavelet transformed. Then in Step S13, a set of transform coefficients of each resolution level resulting from the wavelet transform is MQ encoded.

Then in Step S14, information such as predetermined header information is added to the MQ codes generated in Step S13 to generate code data. The thus generated code data generated conform to the JPEG 2000 standard. Then in Step S15, the code data generated in Step S14 are output.

(The Process of Image Decoding in JPEG 2000)

Figure 2:
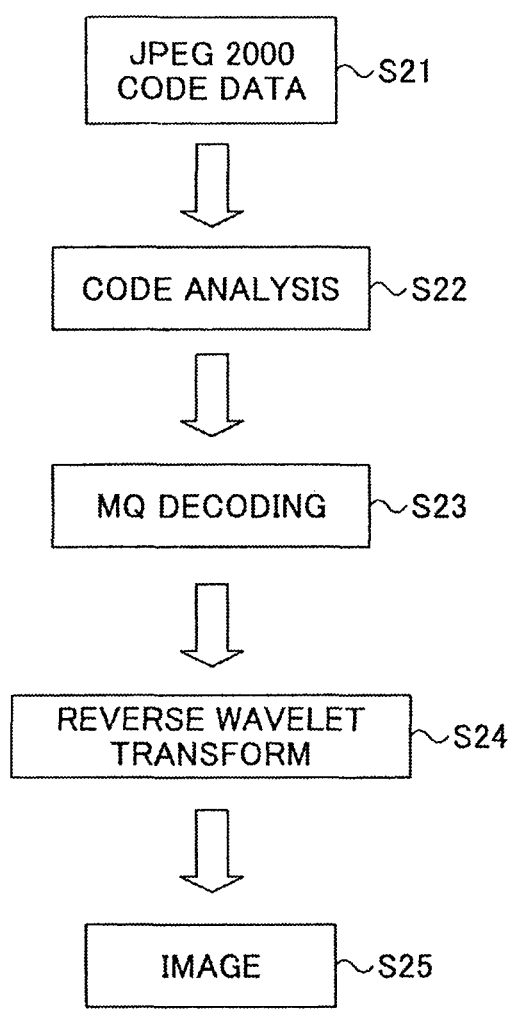
FIG. 2 is a flowchart illustrating the process of image decoding in JPEG 2000.

FIG. 2 is a flowchart illustrating the process of image decoding in JPEG 2000. As shown in FIG. 2, several processing operations are sequentially performed on encoded image data (hereinafter referred to as "code data"), thereby decoding the JPEG 2000 code data into an image. In Step S21 of FIG. 2, code data are input into an apparatus that performs image decoding. Then in Step S22, analysis of packets contained in the code data is performed, thereby obtaining MQ codes of a set of transform coefficients of each resolution level and associated parameters.

Then in Step S23, the MQ codes obtained in Step S22 are decoded into the transform coefficients. Then in Step S24, a reverse wavelength transform is applied to the transform coefficients obtained in Step S23, thereby obtaining values of pixels. Then in Step S25, processing such as color space transform and a reverse level shift is performed, thereby outputting an image.

(Configuration of Code Data)

FIG. 3 is a diagram showing an example of the configuration of JPEG 2000 code data. The code data include an SOC (Start of Codestream) marker (1) at the top, followed by a main header (2). The main header (2) includes parameters for encoding and quantization.

The main header (2) is followed by the contents of the code data. The contents of the code data include an SOT (Start of Tile-Part) marker (3), a tile header (4), an SOD (Start of Data) marker (5), and tile data (6). The SOT marker (3) represents the beginning of data of a tile, and the tile header (4) contains information about the tile such as the size of the tile. The SOD marker (5) represents the beginning of the contents of the tile data. A set of data from the SOT marker (3) through the tile data (6) is included one for each of the tiles of the code data.

An EOC (End of Codestream) marker (7) is provided at the end of the code data.

(Sub-Band, Precinct, and Code-Block)

Figure 4:
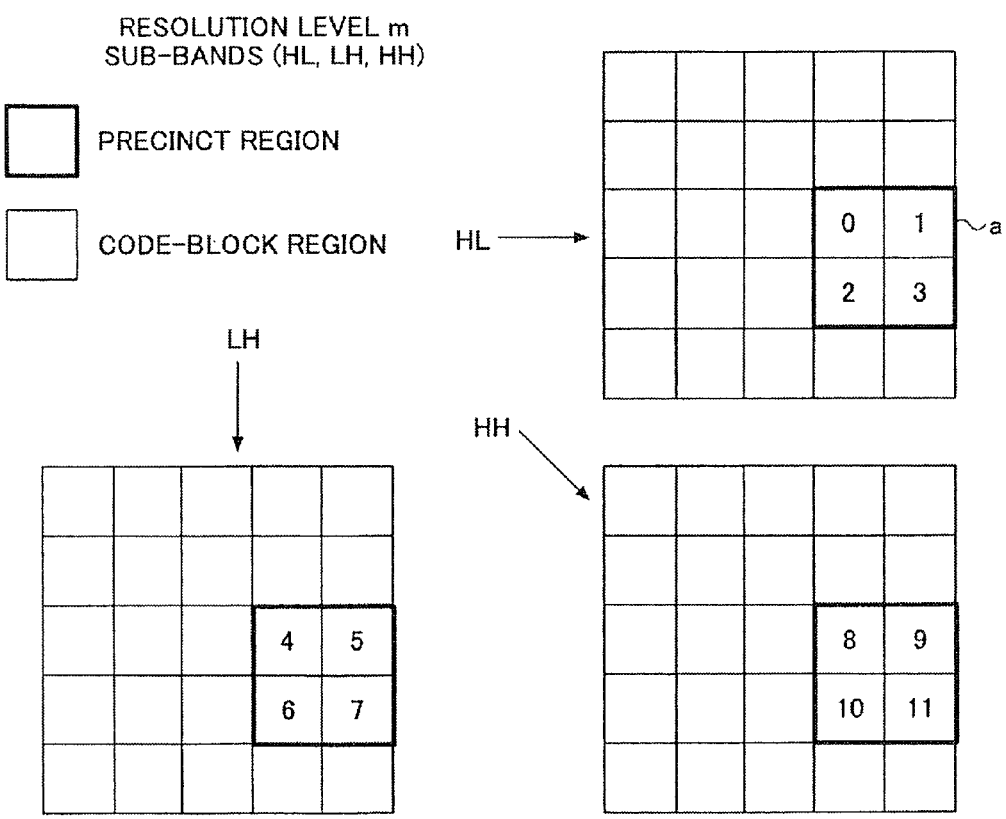
FIG. 4 is a diagram for explaining sub-bands, precincts, and code-blocks in a resolution level produced by a wavelet transform.

FIG. 4 is a diagram for explaining sub-bands, precincts, and code-blocks in a resolution level produced by a wavelet transform. One two-dimensional sub-band decomposition generates four components called "sub-bands", namely, a low horizontal and low vertical frequency component (an LL component), a low horizontal and high vertical frequency component (an LH component), a high horizontal and low vertical frequency component (an HL component), and a high horizontal and high vertical frequency component (an HH component). The LL component is further divided into components of another resolution level by another sub-band decomposition.

Although FIG. 4 illustrates three components, namely, the HL component, the LH component and the HH components, the LL component is encoded at the resolution level corresponding to the lowest resolution in addition to these three components.

In this embodiment, when the resolution is high, the "resolution level" is low, i.e., the number indicating the resolution level is small. When the resolution is low, the "resolution level" is high, i.e., the number indicating the resolution level is large. In other words, the original image, which has the highest resolution, corresponds to the lowest resolution level, i.e., the resolution level 0.

Each component, i.e., sub-band, shown in FIG. 4 is divided into rectangular regions called code-blocks and encoded. The code-blocks are rectangular regions each including a predetermined number of transform coefficients in the x direction and the y direction. Each sub-band may be divided into rectangular regions called precincts, and then the precincts may be divided into code-blocks. In FIG. 4, one precinct contains four code-blocks.

For example, a precinct a of the HL component contains four code-blocks. In MQ encoding, code-blocks in the top row of a precinct are processed sequentially from left to right. After completion of the processing of the top row, code-blocks in the next row are processed from left to right in the same way. That is, when the horizontal direction in FIG. 4 is defined as the x direction and the vertical direction is defined as the y direction, a first code-block line is processed in the x direction, and then the next code-block line is processed.

The term "code-block line" as used herein indicates an array of code-blocks disposed in the same position in the y direction to be aligned in the x direction.

In the case of the precinct a, code-blocks 0, 1, 2 and 3 are processed sequentially in this order.

(Layer)

Figure 5:
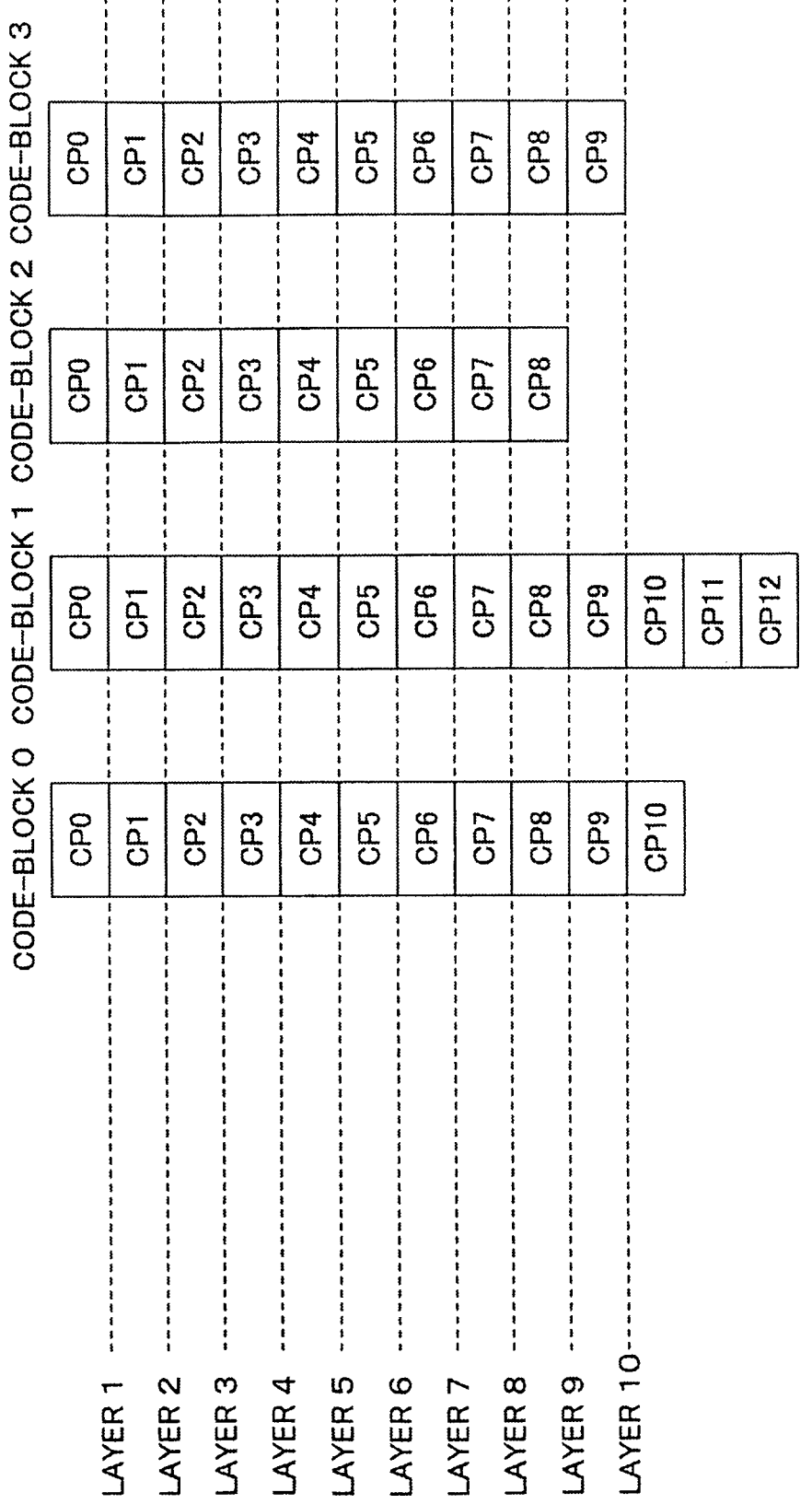
FIG. 5 is a diagram for explaining an example in which a precinct is decomposed into layers and encoded.

FIG. 5 is a diagram for explaining an example in which the precinct a of the HL component of FIG. 4 is decomposed into layers and encoded. Coding passes of the code-blocks 0 through 3 in the precinct a are allocated into their corresponding layers. The term "coding pass" as used herein indicates a bit string of bits selected according to a predetermined standard when encoding a bit-plane. A maximum three coding passes are generated from one bit-plane according to a maximum of three standards.

In FIG. 5, each of the coding passes of the code-blocks corresponds to one of the layers 1 through 10. The bit positions of the transform coefficients of the coding passes contained in the same layer may differ from one code-block to another.

A unit of selected coding passes of all the code-blocks from one layer is called a packet.

(Packet Header and Packet Data)

Figure 6:
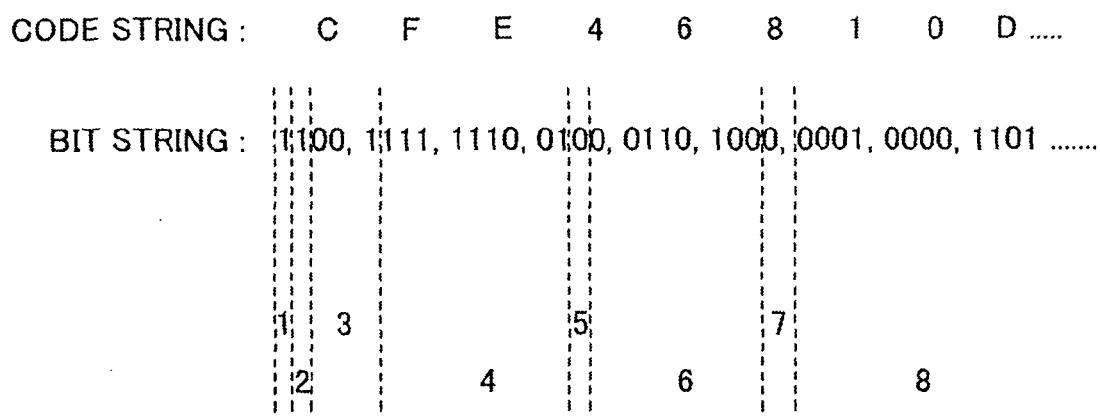
FIG. 6 is a diagram for explaining a packet header and packet data.

FIG. 6 is a diagram for explaining a packet header and packet data. The code data shown in FIG. 6 are "C F E . . . " and the binary representation of the code data is "1100, 1111, 1110, . . . ".

In this binary representation, a segment 1 indicates "zero length packet"; a segment 2 indicates "code-block inclusion"; a segment 3 indicates "zero bit-plane information"; a segment 4 indicates "number of coding passes"; a segment 5 indicates "L block"; a segment 6 indicates "code-block data length"; a segment 7 indicates "zero stuffing"; a segment 8 indicates "packet data". The segments 1 through 7 form a "packet header".

The "code-block inclusion information" of the segment 2 and the "zero bit-plane information" of the segment 3, which are encoded using a below-described tag tree, are described below in detail. Data of other segments are not discussed herein.

In the code-block inclusion information item, for a code-block that has not been previously included in a previous packet (i.e. within a layer), a value in a tag tree represents the number of the layer in which the code-block is first included. For a code-block that has been included in a previous packet, a single bit is used to represent the information, wherein a 1 means that the code-block is included in this layer, and a 0 means that it is not. The zero bit-plane information indicates the number of consecutive all-zero bit-planes from the MSB.

(Tag Tree)

Figure 7:
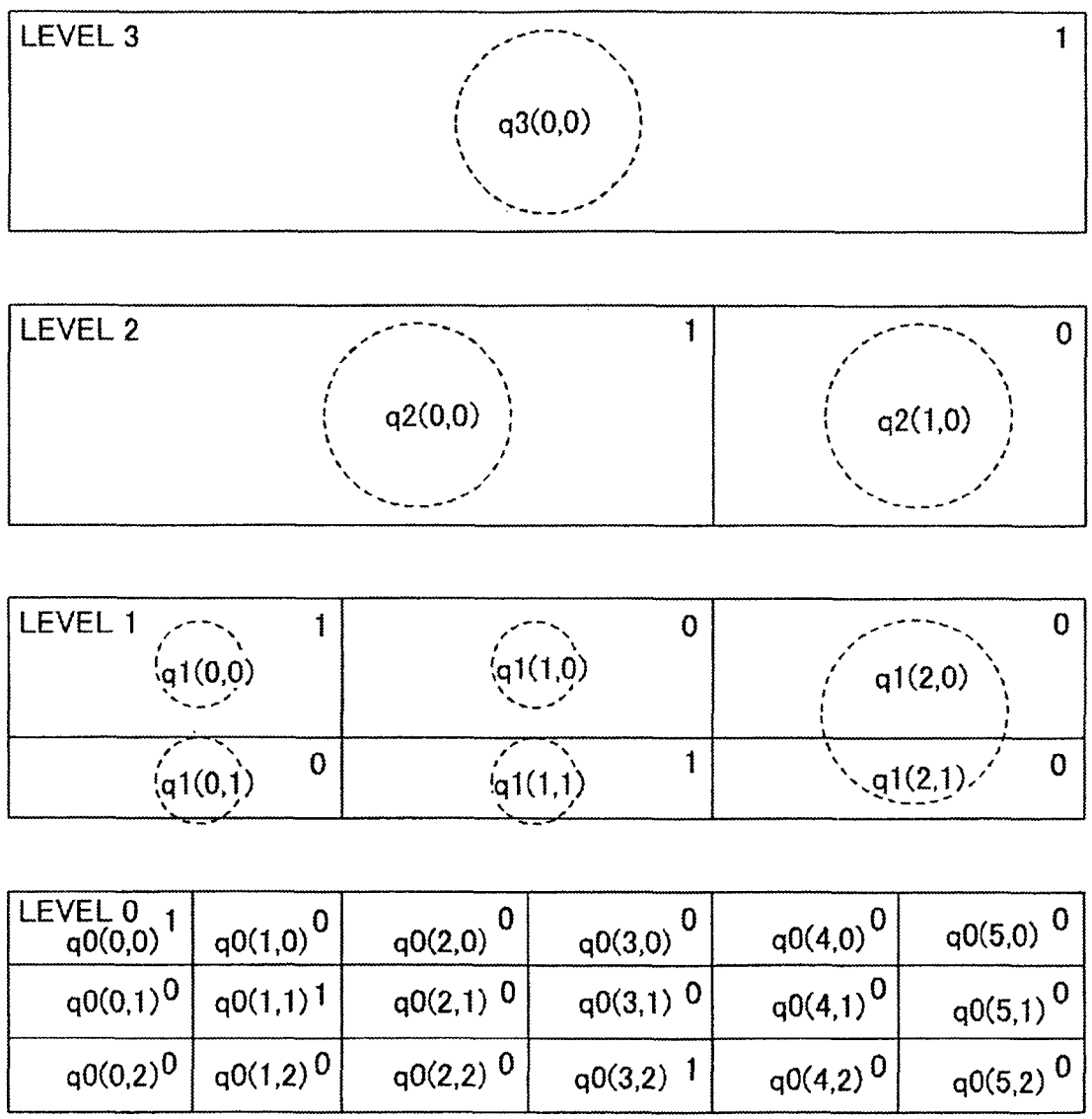
FIG. 7 is a diagram for explaining Generation of information codes using a tag tree.

FIG. 7 is a diagram for explaining generation of information codes using a tag tree. A tag tree is a way that improves encoding efficiency by representing a two-dimensional array of non-negative integers in a hierarchical way. Starting from the two-dimensional original array, the minimum integer of a group of up to four (2 by 2) nodes is recorded at the next tag level as a representative node of the group. Continuing in this fashion, smaller and smaller arrays are defined until a root level is reached, which consists of a single node. Thus these nodes form a tree structure.

The greater the number representing a tag level, the higher the tag level.

A tag tree built from a 3 by 6 two-dimensional array of nodes is illustrated in FIG. 7. A tag level 0 corresponds to a group of code-blocks to be encoded. The tag tree of FIG. 7 includes four levels, namely a tag tree level 0 through 3.

In FIG. 7, qi (m,n) represents the position information of a node m-th from the left and n-th from the top in an i-th level. That is, the m represents the x coordinate of the code-block and the n represents the y coordinate wherein one unit is defined by the size of the individual code-blocks of the current resolution. The value of q0 (m,n) of each node in the tag level 0 represents the information of the same node in the two dimensional array.

The q0 (m,n) is encoded in a tag tree in the following manner. In this example, qi (m,n) represents an inclusion information item indicating whether information of a node position is included. The inclusion information has a value 1 if position information is included, and has a value 2 if position information is not included. In FIG. 7, in the tag level 0, the node including information has 1 at the upper right corner of its rectangular region, while the node not including information has 0 at the upper right corner of its rectangular region.

(1) Values of Nodes in the Tag Level 1

First, values of nodes in the tag level 1 are described. Nodes (q0 (0,0), q0 (1,0), q0 (0,1), and q0 (1,1)) under a node q1 (0,0) of the tag level 1 include one or more pieces of position information. That is, one or more nodes under the node a1 (0,0) are included that have a value 1. Therefore, the value of the node q1 (0,0) is set to 1. Nodes (q0 (2,0), q0 (3,0), q0 (2,1), and q0 (3,1)) under a node q1 (1,0) include no position information items. That is, all the nodes under the node q1 (1,0) have a value 0. Therefore, the value of the node q1 (1,0) is set to 0. In the same fashion, the value of a node q1 (0,1) is set to 0; the value of a node q1 (1,1) is set to 1; the value of a node q1 (2,0) is set to 0; and the value of a node q1 (2,1) is set to 0.

(2) Values of Nodes in the Tag Level 2

Next, values of nodes in the tag level 2 are described. One or more of the nodes (q1 (0,0), q1 (1,0), q1 (0,1), and q1 (1,1)) under a node q2 (0,0) of the tag level 2 have a value 1. Therefore, the value of the node q2 (0,0) is set to 1. All the nodes (q1 (2,0), and q1 (2 μl)) under the node q2 (1,0) have a value 0. Therefore, the value of the node q2 (1,0) is set to 0.

(3) Values of Nodes in the Tag Level 3

Finally, the value of a node q3 (0,0) in the tag level 3 is 1 because one or more of the nodes (q2 (0,0) and q2 (1,0)) under the node q3 (0,0) have a value 1.

In this way, the values, i.e., the inclusion information, of the all the nodes in the all the tag levels are calculated.

(4) Generation of Information Codes in a Tag Tree

Information codes of nodes of a first row of qi (m,n) in a tag tree are described be low.

The node q0 (0,0) is the first node of the array and therefore the information code of the node is "1111", which is a combination of values of the nodes in the highest tag, i.e., the tag level 3, through the lowest tag, i.e., the tag level 0. The node q0 (1,0) is the second node of the array. The parent nodes of the node q0 (1,0) in the tag levels 3 through 1 are the same as the parent nodes of the node q0 (0,0), and hence the values of the parent nodes are omitted. Therefor the information code of the node q0 (1,0) indicates only the value thereof, which is "0".

The node q0 (2,0) is the third node of the array. The parent nodes of the node q0 (2,0) in the tag levels 3 and 2 are the same as the parent nodes of the node q0 (0,0). A combination of the value of the parent node in the tag level 1 and the value of the node q0 (2,0) is 00. However, because the value of the node q1 (1,0) in the immediately higher tag level 1 is 0, it is obvious that the values of nodes under node q1 (1,0) are all 0 Therefor the in Formation code of the node q0 (2,0) indicates the value of the node q1 (1,0) in the tag level 1, which is "0". The node q0 (3, 0) is the fourth node of the array. The parent nodes of the node q0 (3,0) in the tag levels 3 through 1 are the same as the parent nodes of the node q0 (2,0). Therefor the information code of the node q0 (3,0) indicates only the value thereof, which is "0".

The node q0 (4,0) is the fifth node of the array, and inclusion information in the tag level 3 is the same as that of the node q0 (0,0). A combination of the values of nodes in the tag levels 2 through 0 is 000. However, because the value of the parent node in the higher tag level 2 is 0, it is obvious that the values of the nodes thereunder are all 0. Therefore the information code of the q0 (4,0) indicates the value of the parent node in the tag level 2, which is "0".

The node q0 (5, 0) is the sixth node of the array. The parent nodes of the node a0 (5,0) in the tag levels 3 through 1 are the same as the parent nodes of the node q0 (4,0). Therefore the information code of the node q0 (5,0) indicates only the value thereof, which is "0".

(Method of Controlling a Storage Location of Tag Tree Information Items)

The following describes a method of storing information codes represented in a tag tree into a storage unit. The information codes represented in a tag tree are called "tag tree information items".

When generating JPEG 2000 code data from MQ codes encoded by MQ encoding during encoding processing or when extracting MQ codes from JPEG 2000 code data during decoding processing, tag tree information items of code-blocks described in a packet header are analyzed. The analyzed tag tree information items are stored in an internal buffer and/or an external memory for analysis.

The internal buffer may be configured as, e.g., a storage circuit that allows high-speed reading and writing operations. The external memory may be configured as, e.g., a memory circuit that has a large storage capacity although the reading and writing speed and the bus width are limited compared with the internal buffer.

The following two methods can be used for storing tag tree information items. One of the methods is to store all the tag tree information items in the internal buffer and, after completion of code analysis, write all the tag tree information items into the external memory. This method is hereinafter referred to as a "tag tree information batch read/write method". The other method is to store tag tree information items in the external memory, and reads out the tag tree information items into the internal buffer when needed for code analysis. This method is hereinafter referred to as a "tag tree information ad-hoc read/write method".

According to the case of the tag tree information batch read/write method, in the case where no precinct partitioning is used, tag tree information items of code-blocks are recorded in the internal buffer during code analysis of sub-bands and, upon completion of code analysis of the sub-bands, the tag tree information items of code-blocks stored in the internal buffer are loaded into the external memory all at once. In this way, analyses of sub-bands of each resolution level of each color component in a JPEG 2000 code stream are performed sequentially. In the case where precinct partitioning is used, an internal buffer is used that is capable of storing tag tree information items of code-blocks of all the sub-bands of each resolution level of each color component. These tag tree information items are read out all at once from the external memory and are loaded into the internal buffer upon starting analysis of a code stream. Upon completion of the analysis of the code stream, information items stored in the internal buffer are written into the external memory all at once.

On the other hand, according to the tag tree information ad-hoc read/write method, a tag tree information item required for processing a code-block in a sub-band is read out from the external memory. A tag tree information item generated by processing the code-block is read out from the internal buffer and is written into the external memory. In this way, analyses of the sub-bands of each resolution level of each color component of JPEG 2000 code data are performed sequentially.

According to an aspect of the present invention, timings of reading out a tag tree information item from and writing a tag tree information item into an external memory are properly controlled using a tag tree information ad-hoc read/write method. Preferred embodiments of the present invention are described hereinafter with reference to the accompanying drawings.

<First Embodiment>

(First Example of the Functional Configuration of an Image Processing Apparatus According to a First Embodiment of the Present Invention)

Figure 8:
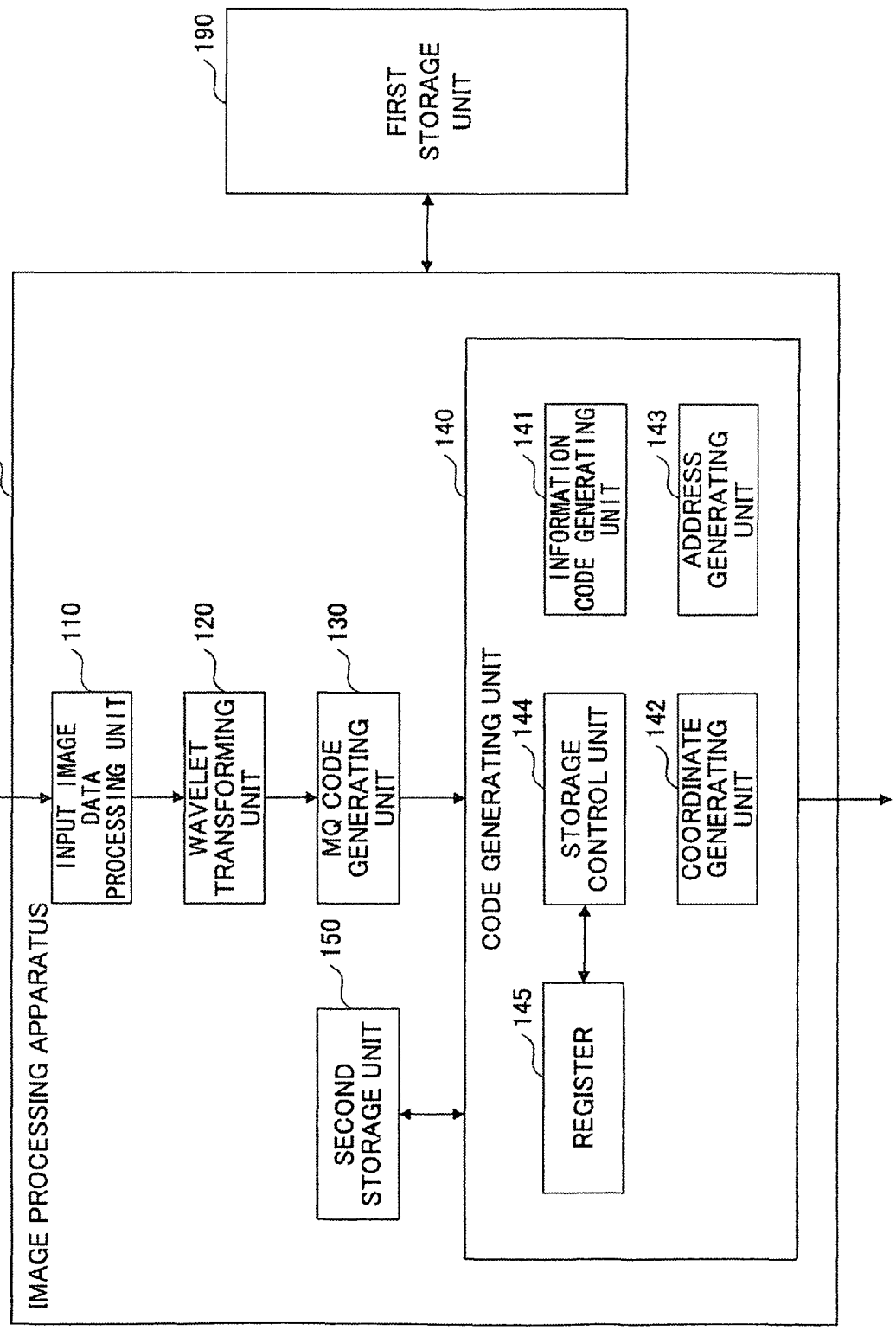
FIG. 8 is a functional block diagram illustrating a first example of an image processing apparatus according to a first embodiment of the present invention.

FIG. 8 is a functional block diagram illustrating a first example of an image processing apparatus 1 according to a first embodiment of the present invention. The image processing apparatus 1 of FIG. 8 generates code data by processing input image data by using plural processing units. The image processing apparatus 1 includes, for example, a code generating unit 140. The image processing apparatus 1 may further include an input image data processing unit 110, a wavelet transforming unit 120, an MQ code generating unit 130, and a second storage unit 150.

The code generating unit 140 generates various parameters associated with MQ encoded transform coefficients and creates packets including codes of the parameters and the transform coefficients. The code generating unit 140 further sorts the packets in a predetermined order and adds predetermined header information, thereby generating code data.

The code generating unit 140 includes, for example, an information code generating unit 141, a coordinate generating unit 142, and an address generating unit 143. The code generating unit 140 may further include a storage control unit 144 and a register 145.

The information code generating unit 141 is configured to generate tag tree information items, which are information codes represented in a tag tree. The information code generating unit 141 generates tag tree information items according to the procedure described in the section titled "(4) Generation of information codes in a tag tree".

The coordinate generating unit 142 generates x coordinates and y coordinates of code-blocks of each resolution wherein one unit is defined by the size of the individual code-blocks of the corresponding resolution. The address generating unit 143 generates addresses for storing tag tree information items in a first storage unit 190 (described below) and the second storage unit 150.

The storage control unit 144 sets values in the register 145, determines information codes to be stored in the second storage unit 150 and information codes to be stored in the first storage unit 190, and reads and writes the information codes.

In the register 145, values are set by the storage control unit 144. The values set in the register 145 control the timings of reading or writing of corresponding tag tree information Items.

The second storage unit 150 stores tag tree information items to be processed by the code generating unit 140. The second storage unit 150 is configured as, for example, an internal buffer of the image processing apparatus 1 that allows high-speed reading and writing operations.

The input image processing unit 110 is configured to process input image data. The input image data processing unit 110 performs the operation at Step S11 of FIG. 1, for example. The wavelet transforming unit 120 is configured to apply two-dimensional wavelet transform to the input image data. The wavelet transforming unit 120 performs the operation at Step S12 of FIG. 1, for example. The MQ code generating unit 130 is configured to MQ encode the transform coefficients resulting from wavelet transform into MQ codes. The MQ code generating unit 130 performs the operation at Step S13 of FIG. 1, for example.

The first storage unit 190 is configured to store data to be processed by the image processing apparatus 1. The first storage unit 190 is configured as, e.g., an SDRAM which provides a greater data storage capacity than the second storage unit 150 and is capable of storing a large volume of data and reading and/or writing the data based on a predetermined bus width. The second storage unit 150 stores, e.g., image data, transform coefficients, or tag tree information items.

(Second Example of the Functional Configuration of an Image Processing Apparatus According to the First Embodiment of the Present Invention)

Figure 9:
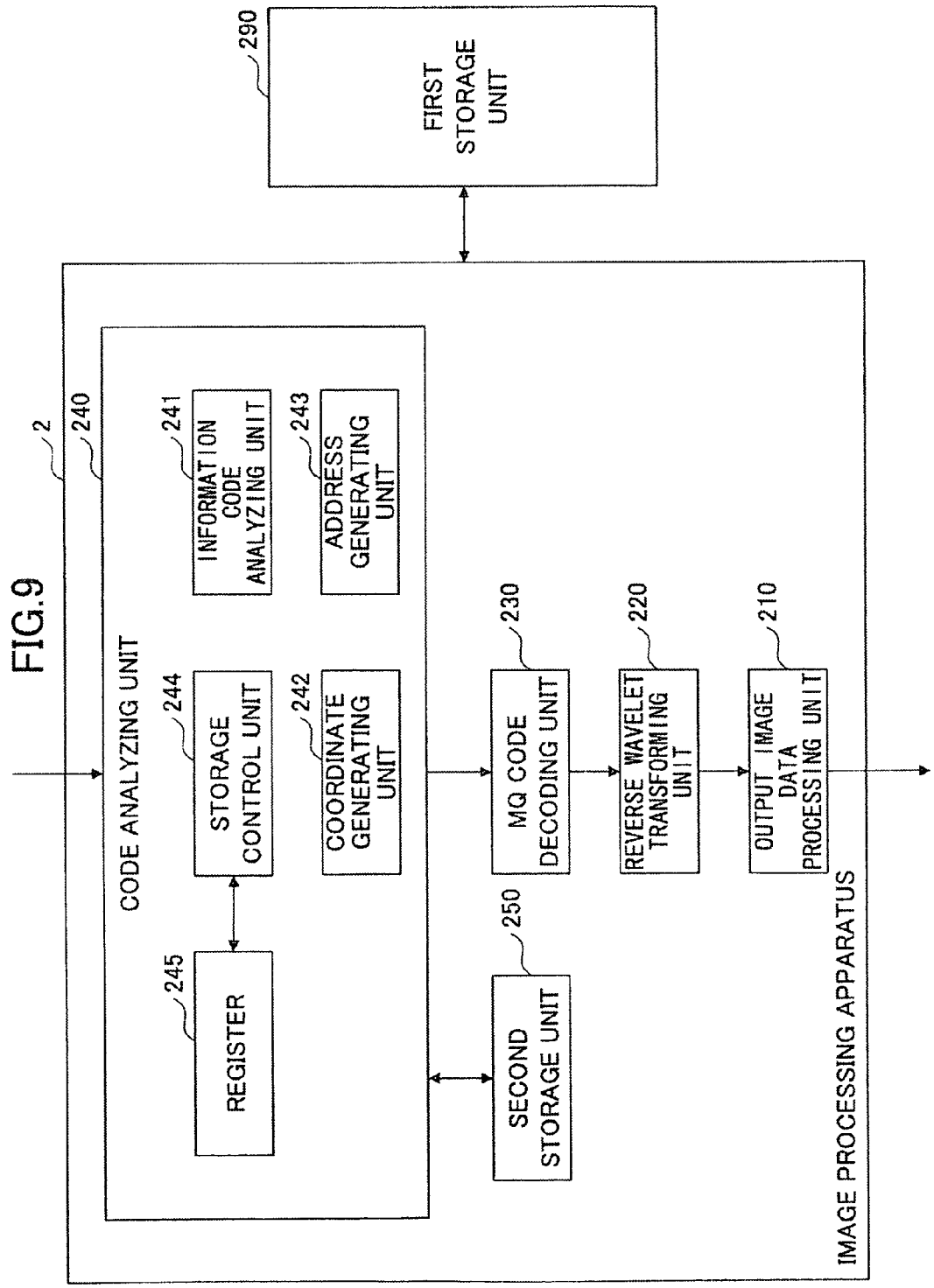
FIG. 9 is a functional block diagram illustrating a second example of an image processing apparatus according to the first embodiment of the present invention.

FIG. 9 is a functional block diagram illustrating a second example of an image processing apparatus 2 according to the first embodiment of the present invention. The image processing apparatus 2 of FIG. 9 generates decoded image data by processing input code data by using plural processing units. The image processing apparatus 2 includes, for example, a code analyzing unit 240. The image processing apparatus 2 may further include an output image data processing unit 210, a reverse wavelet transforming unit 220, an MQ code decoding unit 230, and a second storage unit 250.

The code analyzing unit 240 analyzes header information such as a main header and a tile header in the input code data to extract packets, and decodes tag tree information items. Further, the code analyzing unit 240 extracts MQ codes and outputs the MQ codes to the MQ code decoding unit 230.

The code analyzing unit 240 includes, for example, an information code analyzing unit 241, a coordinate generating unit 242, and an address generating unit 243. The code analyzing unit 240 may further include a storage control unit 244 and a register 245.

The information code analyzing unit 241 is configured to analyze and decode tag tree information items, which are information codes represented in a tag tree. The information code analyzing unit 241 obtains values of pieces of information such as inclusion information from the tag tree information items in the reverse order of the procedure described in the section titled "(4) Generation of Information codes in a tag tree".

The coordinate generating unit 242 generates x coordinates and y coordinates of code-blocks of each resolution wherein one unit is defined by the size of the individual code-blocks of the corresponding resolution. The address generating unit 243 generates addresses for storing tag tree information items in a first storage unit 290 (described below) and the second storage unit 250.

The storage control unit 244 sets values in the register 245, determines information codes to be stored in the second storage unit 250 and information codes to be stored in the first storage unit 290, and reads and writes the information codes.

In the register 245, values are set by the memory control unit 244. The values set in the register 245 control the timings of reading or writing information of corresponding tag tree information items.

The second storage unit 250 stores tag tree information items to be processed by the code analyzing unit 240. The second storage unit 250 is configured as, for example, an internal buffer of the image processing apparatus 2 that allows high-speed reading and writing operations.

The output image processing unit 210 is configured to process image data to be output. The output image data processing unit 210 performs the operation at Step S25 of FIG. 2, for example. The reverse wavelet transforming unit 220 is configured to apply two-dimensional reverse wavelet transform to the transform coefficients. The reverse wavelet transforming unit 220 performs the operation at Step S24 of FIG. 2, for example. The MQ code decoding unit 230 is configured to decode MQ codes into wavelet transform coefficients. The MQ code decoding unit 230 performs the operation at Step S23 of FIG. 2, for example.

The first storage unit 290 is configured to store data to be processed by the image processing apparatus 2. The first storage unit 290 is configured as, e.g., an SDRAM which provides a greater data storage capacity than the second storage unit 250 and is capable of storing a large volume of data and reading and/or writing the data based on a predetermined bus width. The second storage unit 250 stores, e.g., image data, transform coefficients, or tag tree information items.

The image processing apparatus 1 of FIG. 8 and the image processing apparatus 2 of FIG. 9 may be provided as an integral image processing unit. For example, the input image data processing unit 110 and the output image data processing unit 210 may be completely or partly integrated and provided as a single unit such as a circuit or a device. Similarly, the wavelet transforming unit 120 and the reverse wavelet transforming unit 220; the MQ code generating unit 130 and the MQ code decoding unit 230; and the code generating unit 140 and the code analyzing unit 240 may be completely or partly integrated and provided as single units, respectively, such as a circuit or a device.

Similarly, the second storage unit 150 and the second storage unit 250; and the first storage unit 190 and the first storage unit 290 may be completely or partly integrated and provided as single units, respectively, such as a circuit or a device.

The second storage units 150 and 250 may not necessarily be provided inside the image processing apparatuses 1 and 2, respectively. Similarly, the first storage units 190 and 290 may not necessarily be provided outside the image processing apparatuses 1 and 2, respectively.

(The Process of the Tag Tree Information Ad-Hoc Read/Write Method)

Figure 10:
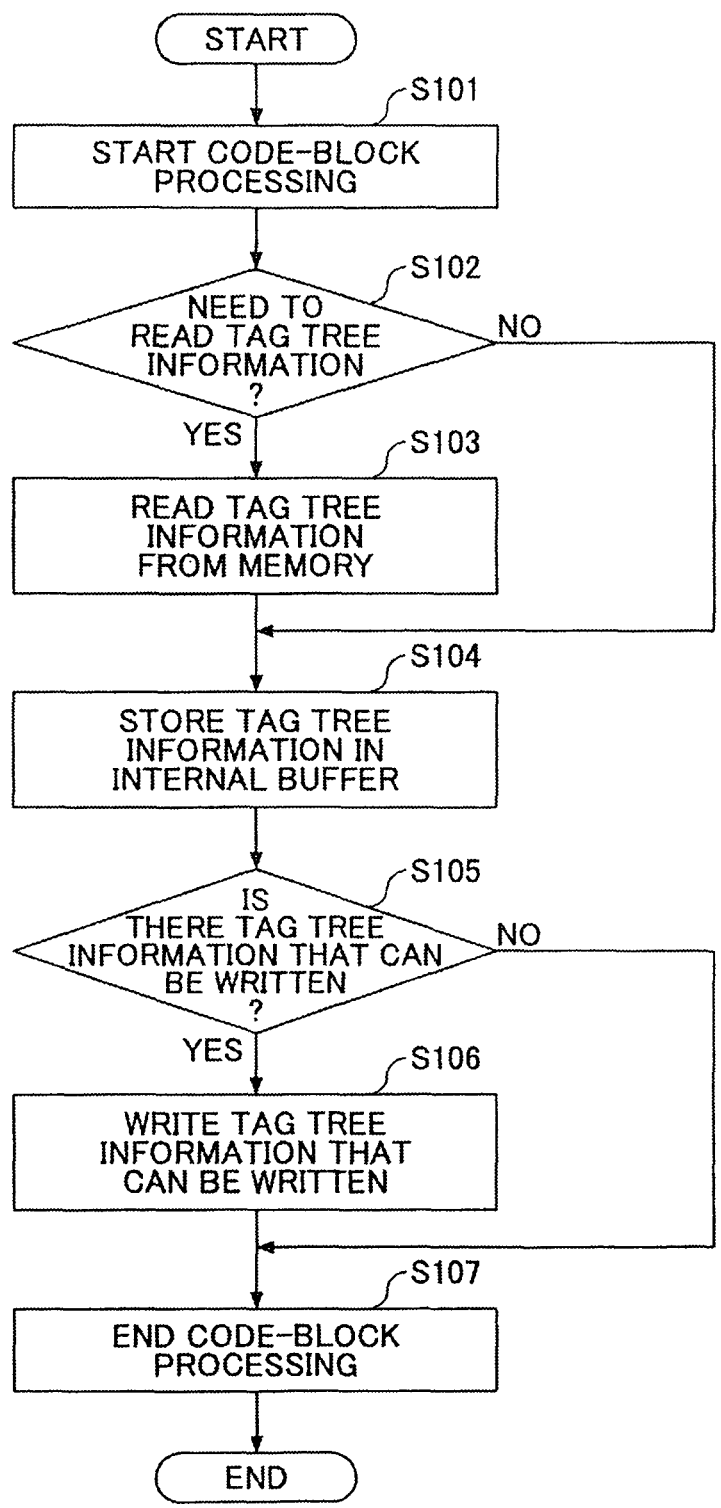
FIG. 10 is a flowchart illustrating an example of processing by a tag tree information ad-hoc read/write method according to the first embodiment of the present invention.

FIG. 10 is a flowchart illustrating an example of processing by a tag tree information ad-hoc read/write method according to the first embodiment of the present invention. The example illustrated in FIG. 10 is a decoding process. An encoding process by the tag tree information ad-hoc read/write method can be easily understood from FIGS. 8 and 9 and therefore the decoding process is not described herein.

FIG. 10 shows the process of analyzing obtained packets after completion of analysis of a main header and a tile header (s) of JPEG 2000 code data. The packet analysis includes operations of analyzing a packet header and obtaining packet data. The process of FIG. 10 is performed by the image processing apparatus 2 of FIG. 9, for example.

In FIG. 10, "READ" refers to an operation for reading tag tree information items from the first storage unit 290 as the external memory; "WRITE" refers to an operation of writing tag tree information items into the first storage unit 290; and "MEMORY" refers to the first storage unit 290.

Referring to FIG. 10, in Step S101 (the code analyzing unit 240 starts processing of a code-block of a packet. Then in Step S102, the storage control unit 244 determines whether a tag tree information item that has been analyzed needs to be obtained from the first storage unit 190. If the tag tree information item needs to be obtained, the process proceeds to Step S103. Of not, the process proceeds to Step S104. The determination of Step S102 may be made by referring to a value of a parameter in the register 245.

In Step S103, the storage control unit 244 reads out the tag tree information item from the first storage unit 290. In Step 104, the storage control unit 244 loads the tag tree information item read in Step S103 into the second storage unit 250 as an internal buffer.

The process proceeds from Step S104 to Step S105. Between Step S104 and S105, an information item related to a code-block may be decoded from the tag tree information item. The information item related to a code-block may include, e.g., zero bit-plane information and/or code-block inclusion information.

In Step S105, the storage control unit 244 determines whether any of the tag tree information items stored in the second storage unit 250 can be written into the first storage unit 290. If there is a tag tree information item that can be written into the first storage unit 290, the process proceeds to Step S103. If not, the process proceeds to Step S104. The determination of Step 105 may be made by referring to a value of a parameter in the register 245.

In Step S106, the storage control unit 244 reads out the tag tree information item that is determined to be written into the first storage unit 290 in Step S105 from the second storage unit 250, and writes the read tag tree information item into the first storage unit 290.

In Step S107, the code analyzing unit 240 ends the processing of the code-block.

(Processing Code-Blocks and Storing Tag Tree Information Items)

Figure 11:
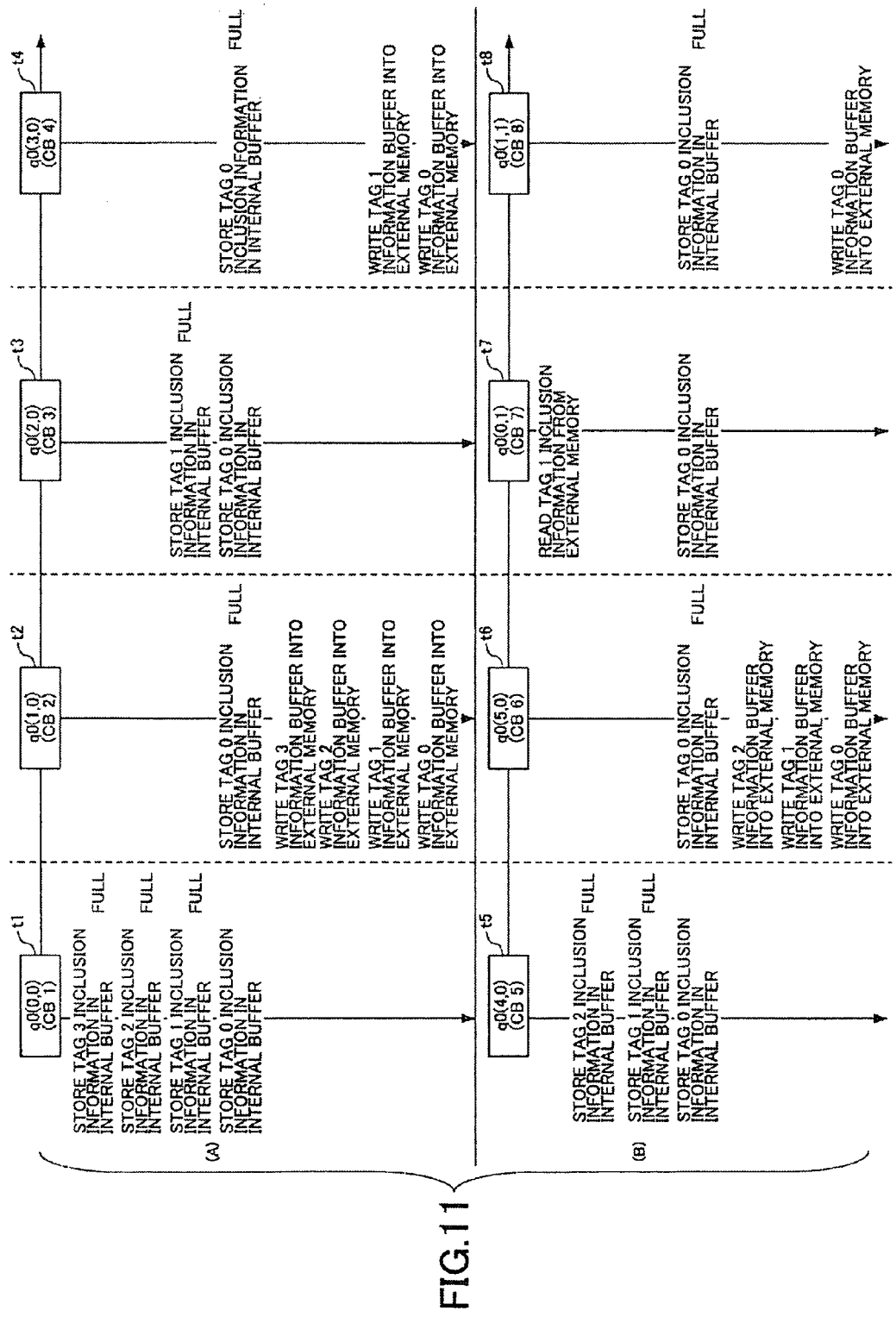
FIG. 11 is a chart illustrating operations of processing code-blocks and storing tag tree information items.

FIG. 11 is a chart illustrating operations of processing code-blocks and storing tag tree information items. The operations illustrated in FIG. 11 are performed when analyzing tag tree information items of a tag tree structure of FIG. 7, for example. Operations or reading data from an external memory and loading the read data into an internal buffer and operations of reading data from the internal buffer and loading the read data into the external memory when generating tag tree information items can be easily understood from the operations performed when analyzing tag tree information items, and are therefore not described herein.

In FIG. 11, "EXTERNAL MEMORY" refers to, e.g., the first storage unit 290 of FIG. 9, and "INTERNAL BUFFER" refers to, e.g., the second storage unit 250 of FIG. 9. In the internal buffer, data storage locations are assigned based on the tag level, for example. In the example shown in FIG. 11, one bit is allocated for each of tag levels 3 through 1, and two bits are allocated for the tag level 0.

In FIG. 11, information codes of a code-block-related information item are analyzed and obtained for each of eight code-blocks, namely, code-blocks CB1 through CB8. For example, predetermined processing time is assigned to each of the code-blocks CB1 through CB8 by a not shown control unit. The not shown control unit specifies a code-block to be processed and causes the responsible processing units to perform processing.

First, at processing time t1, analysis of a tag tree information item of the code-block CB1 is performed. More specifically, the information code analyzing unit 241 obtains sequentially analyzed tag tree information items and stores the obtained information items in the internal buffer. The processing at the processing time t1 is described below in greater detail. First, an inclusion information item of the tag level 3 is analyzed and stored in the internal buffer. This inclusion information item is stored in the storage location for the tag level 3, so that the storage location for the tag level 3 becomes FULL.

Then, an inclusion information item of the tag level 2 is analyzed and stored in the internal buffer. This inclusion information item is stored in the storage location for the tag level 2, so that the storage location for the tag level 2 becomes FULL. Then, an inclusion information item of the tag level 1 is analyzed and stored in the internal buffer. This inclusion information item is stored in the storage location for the tag level 1, so that the storage location for the tag level 1 becomes FULL.

Finally, an inclusion information item of the tag level 0 is analyzed and stored in the internal buffer. Since two bits are allocated for the storage location for the tag level 0, the storage location for the tag level 0 does not become FULL.

Then, the code-block CB2 is processed at processing time t2. The code-block CB2 has the same inclusion items of the tag levels 1 through 3 as those of the code-block CB1. Therefore, only an inclusion information item of the tag level 0 is analyzed and stored in the internal buffer. This inclusion Information item is stored in the storage location for the tag level 0, so that the storage location for the tag level 0 becomes FULL.

At this processing time t2, after all the storage locations of the internal buffer for the tag levels 3 through 0 become FULL, all the information inclusion items stored in the internal buffer are written into the external memory. Thus, the internal buffer recovers the storage capacity, thereby allowing the next processing to be performed.

In the same manner at the processing time t1 and t2, at processing time t3 though t8, inclusion information items stored in the internal buffer are written into the external memory at predetermined timings. In this way, the tag tree information ad-hoc read/write method is performed.

(Address for Storing Tag Tree Information)

Figure 12:
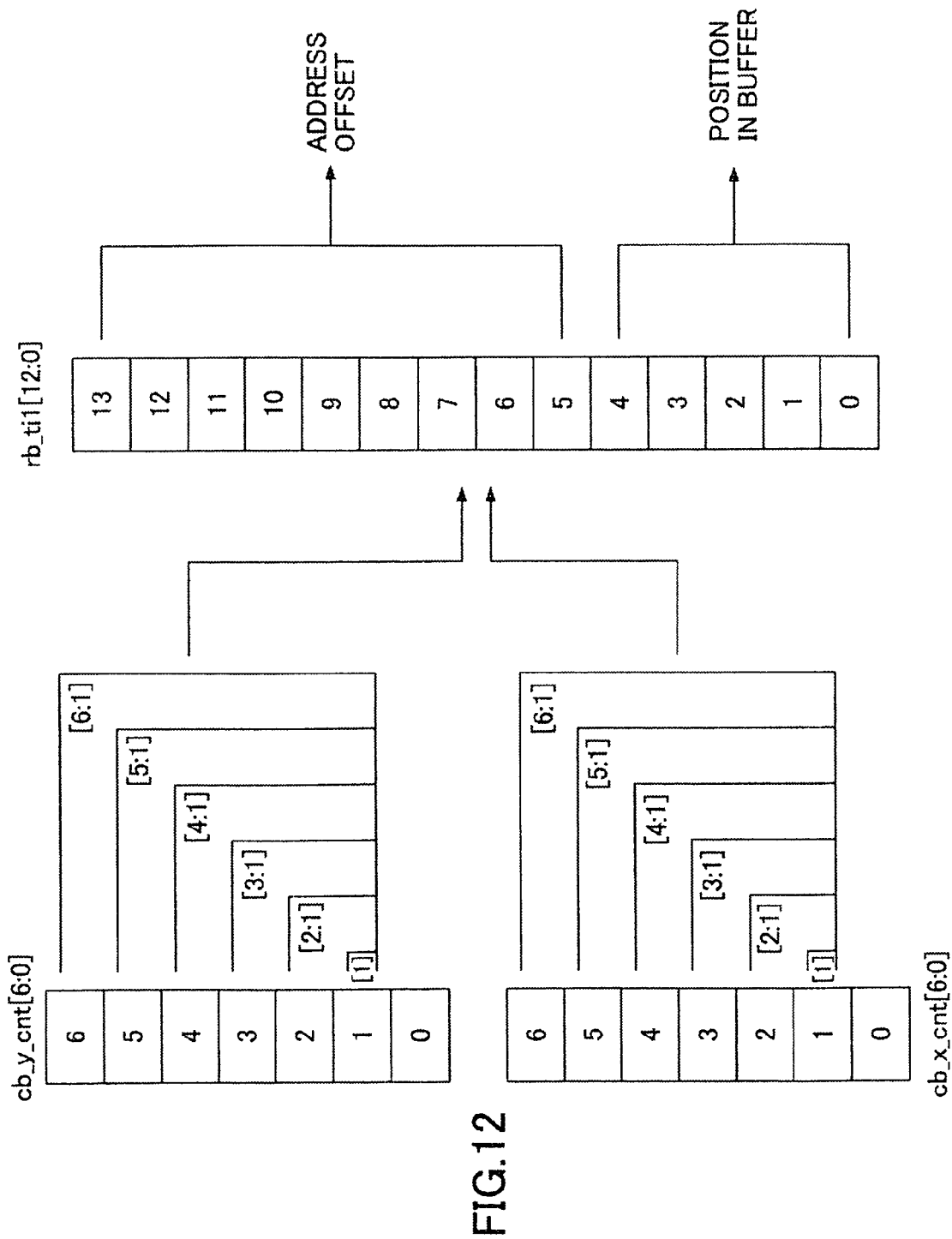
FIG. 12 is a diagram for explaining addressing for storing tag tree information.

FIG. 12 is a diagram for explaining addressing for storing tag tree information. In FIG. 12, values of a predetermined bit width are extracted from the space coordinate position (x, y) of a code-block in a sub-band and are rebuilt based on the resolution level and precinct information, thereby easily determining memory address offset of the internal buffer and the position of code-block tag tree information in the internal buffer at the same time.

The address generation of FIG. 12 can be performed by the coordinate generating unit 142 and the address generating unit 143, or the coordinate generation unit 242 and the address generating unit 243.

In FIG. 12, based on an address system in which one unit is defined by the size of the code-block, the coordinate generating unit 142 or 242 assigns an address (cb_x_cnt, cb_y_cnt) to each code-block. A combination value resulting from a bit combination of cb_x_cnt and cb_y_cnt is rb_til.

The bit lengths of cb_x_cnt and cb_y_cnt differ depending on the resolution level or the sub-band to be processed or the resolution of the precinct. The value rb_til has a fixed length based on the capacity of the external buffer and the bus width for accessing the external memory. In the example shown in FIG. 12, the bit length of rb_til is 13 bits.

For example, in the case of processing a code-block comprising 32 by 32 transform coefficients, if a precinct comprises 128 by 128 transform coefficients, the precinct includes 16 (4 by 4) code-blocks. Thus, each of cb_x_cnt and cb_y_cnt requires a bit length of two bits. In this case, the address generating unit 143 or 243 stores the value resulting from a bit combination of cb_x_cnt and cb_y_cnt in the low-order 4 bits of the rb_til and stores 0 in the remaining high-order 9 bits.

As another example, in the case where a code-block comprises 32 by 32 transform coefficients as in the example described above and a precinct comprises 256 by 256 transform coefficients, the precinct includes 64 (8 by 8) code-blocks. Thus, each of cb_x_cnt and cb_y_cnt requires a bit length of three bits. In this case, the address generating unit 143 or 243 stores the value resulting from a bit combination of cb_x_cnt and cb_y_cnt in the low-order 6 bits of the rb_til and stores 0 in the remaining high-order 7 bits.

In the example of FIG. 12, the capacity of the internal buffer is 32 bits. Therefore, five bits are required to represent an address in the internal buffer. Then, the address generating unit 143 or 243 uses the low-order 5 bits of rb_til for representing an address.

If the external memory is configured as, e.g., an SDRAM, reading and writing are performed based on a predetermined bus width. The value consisting of bits of rb_til from which low-order bits corresponding to this bus width, i.e., a burst length, are removed is used as an address offset value for accessing the external memory, thereby enabling efficient access to the external memory.

The burst length may have the same capacity as the capacity of the internal buffer, so that the information items read from the external memory by a single reading can be loaded into the internal buffer all at once and the values held in the internal buffer can be written into the external memory all at once, allowing efficient reading from and writing into the external memory.

If there are two or more types of tag three information items, the burst length may have the same capacity as the capacity of the internal buffer allocated to each of the different types of tag tree information items, so that the information items read from the external memory by a single reading can be loaded into the internal buffer all at once on a per tag tree information type basis.

FIG. 13 shows an example of a description of a register transfer level in a hardware description language for realizing the address generation of FIG. 12. In FIG. 13, Pre_ok indicates whether a precinct is used; Pre_size indicates the size of the precinct; and leveln indicates a resolution level n. "rb_til", "rb_zil", and "rb_znl" are combination values, each resulting from a bit combination of cb_x_crit and cb_y_cnt in the tag level 1 and are code-block inclusion information, zero bit-plane inclusion information, and zero bit-plane information, respectively. The zero bit-plane inclusion information indicates whether zero bit-plane information is included.

(Controlling Storing Code-Block Inclusion Information)

Figure 14:
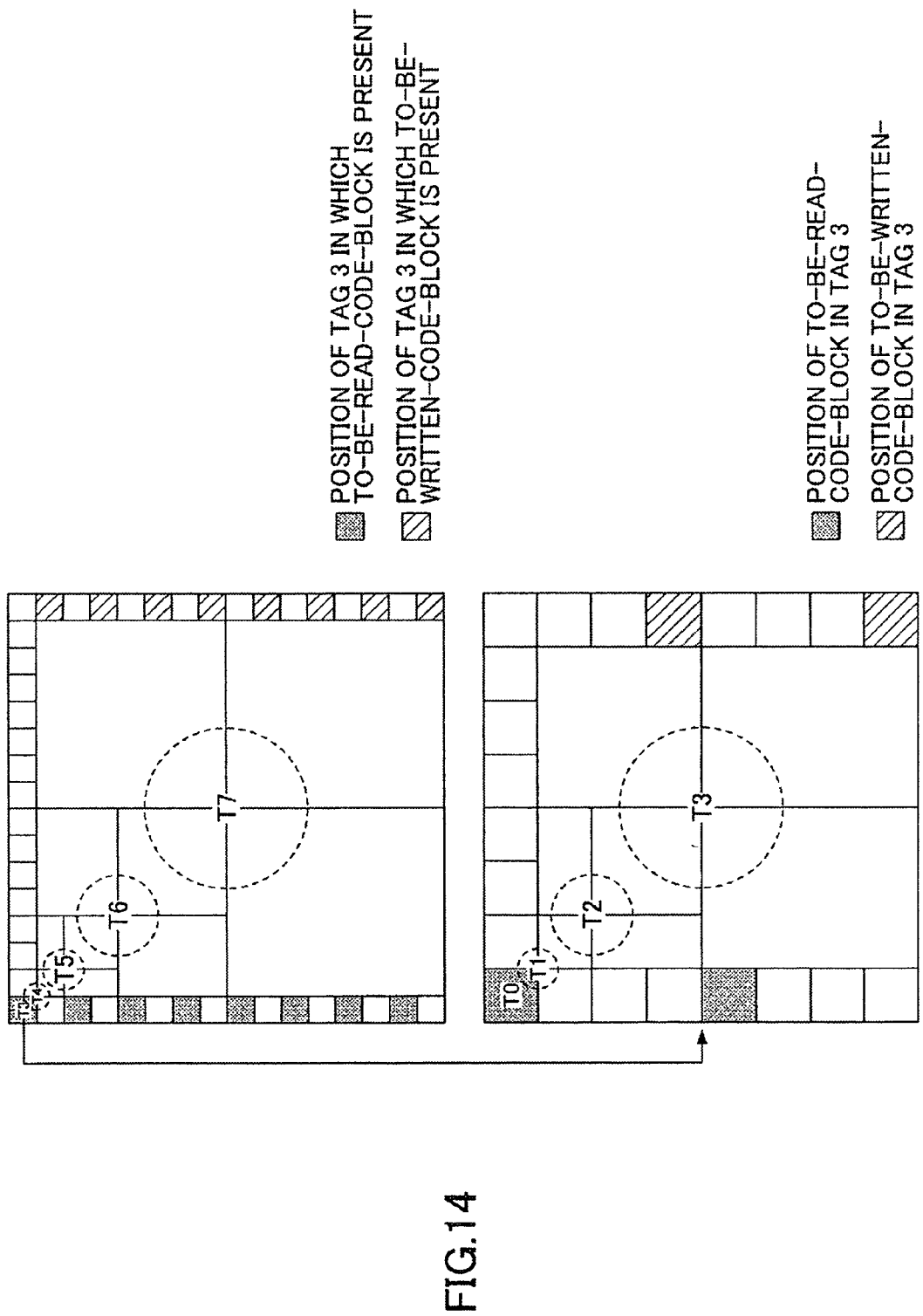
FIG. 14 is a diagram for explaining controlling loading of code-block inclusion information.

FIG. 14 is a diagram for explaining controlling the timing for reading tag tree information items from the internal buffer and writing them into the external memory or the timing for reading tag tree information items from the external memory and loading them into the internal buffer. FIG. 15 shows an example of a description of determination of the timing in a hardware description language for realizing the operations of FIG. 14.

FIG. 14 illustrates the timing for loading code-block inclusion information of each code-block of the tag level 3. The timing for reading code-block inclusion information items from the internal buffer and writing them into the external memory is after completion of the processing of tag tree information items in the code-blocks indicated by hatched lines in FIG. 14. Information is transferred from the internal buffer to the external memory when the storage location for tag level 3 in the internal buffer becomes FULL, thereby making it possible to reduce the number of access times to the external memory and improve the overall processing speed compared to the case where information is transferred from the internal buffer to the external memory one item by one item.

A code-block inclusion information item is represented by 1 bit. That is, an internal buffer of 32-bit capacity becomes FULL every time 32 code-blocks are processed. The value of the address assigned to a code-block inclusion information item is incremented by 1 every time a code-block is processed as described with reference to FIG. 12.

Then, in FIG. 15, the storage control unit 144 or 244 executes writing into the external memory when a tag tree information item is stored in a predetermined address in the internal buffer. That is, the storage control unit 144 or 244 determines whether the address at which a tag tree information item is stored has a predetermined value.

In FIG. 15, in the case where the addresses in the internal buffer are represented by numbers 0 through 31, the timing for writing into the external memory is when information is written into the address represented by 31.

According to the expression (1) of FIG. 15, if the value of matwti3 is not 0, then writing into the external memory is performed.

The definitions of the variables in the expressions (1) and (2) are as follows:

packet_hd represents the processing period of a packet header;

packet_d represents the processing period of the packet header and packet data;

lay_first represents layer information;

rn_enb represents information whether inclusion information of a tag level n is present;

bn_tim represents the position of a code-block inclusion information item of a tag level m in the internal buffer; and T3ucd represents information whether the current code-block is included in the first code-block line in the tag level 3.

The term "processing period" as used herein refers to a period of time taken to process data, which period of time is controlled by a not shown control unit in a circuit that performs the operation of FIG. 15. The term "layer information" as used herein refers to information indicating whether the current layer is the first layer of the current code-block.

Referring back to FIG. 14, the timing for reading code-block inclusion information items from the external memory and loading them into the internal buffer is before processing the tag tree information items in the code-blocks indicated by shadow areas. Code-block inclusion information items having a volume equal to the capacity of the internal buffer are read all at once, thereby making it possible to reduce the number of access times to the external memory and improve the overall processing speed.

Since a code-block inclusion information item is represented by 1 bit, if an internal buffer of 32-bit capacity is used, code-block inclusion information items for 32 code-blocks are preferably read at a time. The value of the address assigned to a code-block inclusion information item is incremented by 1 every time a code-block is processed as described with reference to FIG. 12.

According to the expression (2) of FIG. 15, in the case where the addresses in the internal buffer are represented by numbers 0 through 31, reading from the external memory is performed when processing a code-block inclusion information item at the address represented by 0. In FIG. 15, if the value of matrti3 is not 0, then reading from the external memory is performed. The definitions of the variables are the same as those of the expression (1).

(Controlling Storing Zero Bit-Plane Inclusion Information)

Figure 16:
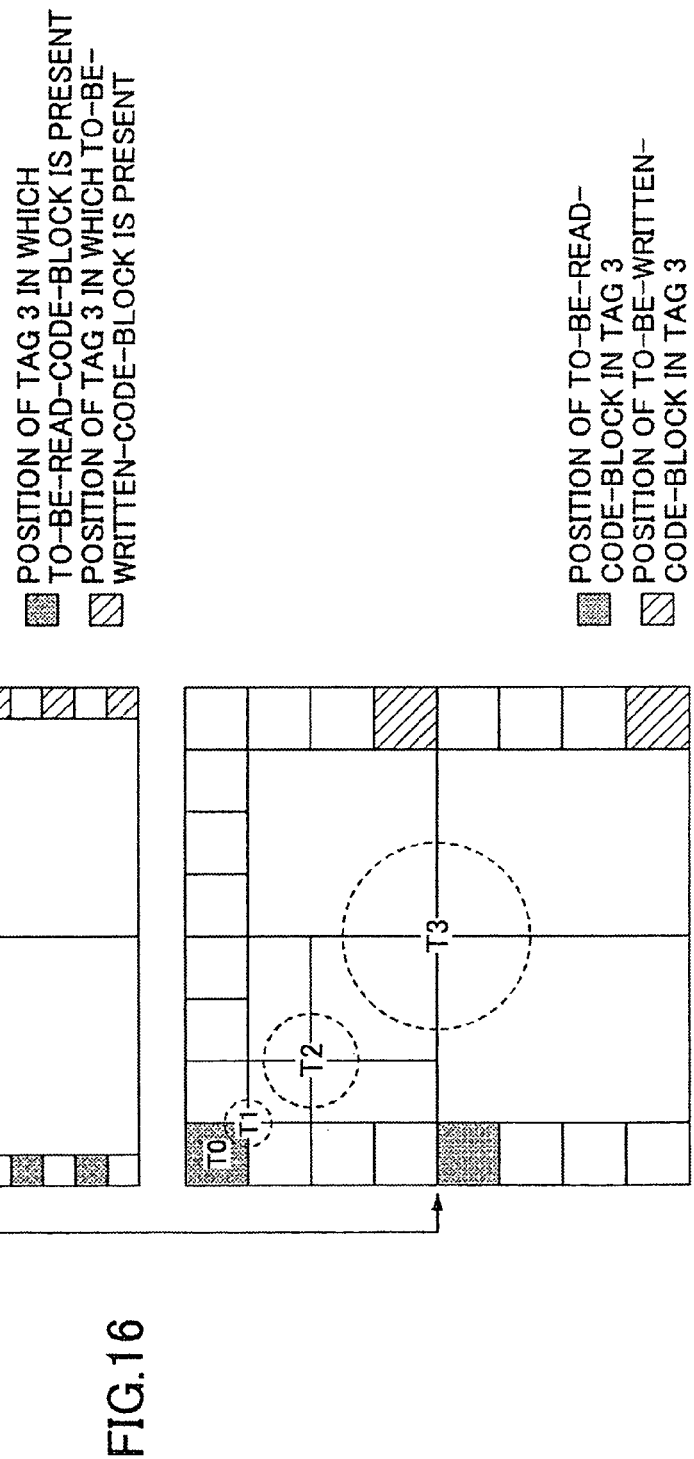
FIG. 16 is a diagram for explaining controlling loading of zero bit-plane inclusion information.

FIGS. 16 and 17 are diagrams for explaining controlling loading of zero bit-plane inclusion information. Similar to the code-block inclusion information item, a zero bit-plane inclusion information item is represented by 1 bit. Therefore, zero bit-plane inclusion information items are preferably read from and written into the external memory at the same timings as code-block information items.

In FIG. 16, code-blocks read from the external memory are indicated by shadow areas, and code-blocks to be written into the external memory are indicated by hatched lines. The timings for reading and writing the code-blocks are the same as the timings in the case of FIG. 14 and are not described herein.

FIG. 17 is an example of a description in a hardware description language for realizing the operations of FIG. 16. According to the expression (3) of FIG. 17, if the value or matwzi3 is not 0, then writing into the external memory is performed. According to the expression (4), if the value of matrzi3 is not 0, then reading from the external memory is performed. In the expressions (3) and (4), bn_zim represents the address of a zero bit-plane information item of a tag level m in the internal buffer. The definitions of other variables are the same as those of the expressions (1) and (2). The timings controlled by the expressions (3) and (4) of FIG. 17 are the same as the timings controlled by the expressions (1) and (2) of FIG. 15, respectively.

(Controlling Storing Zero Bit-Plane Information)

Figure 18:
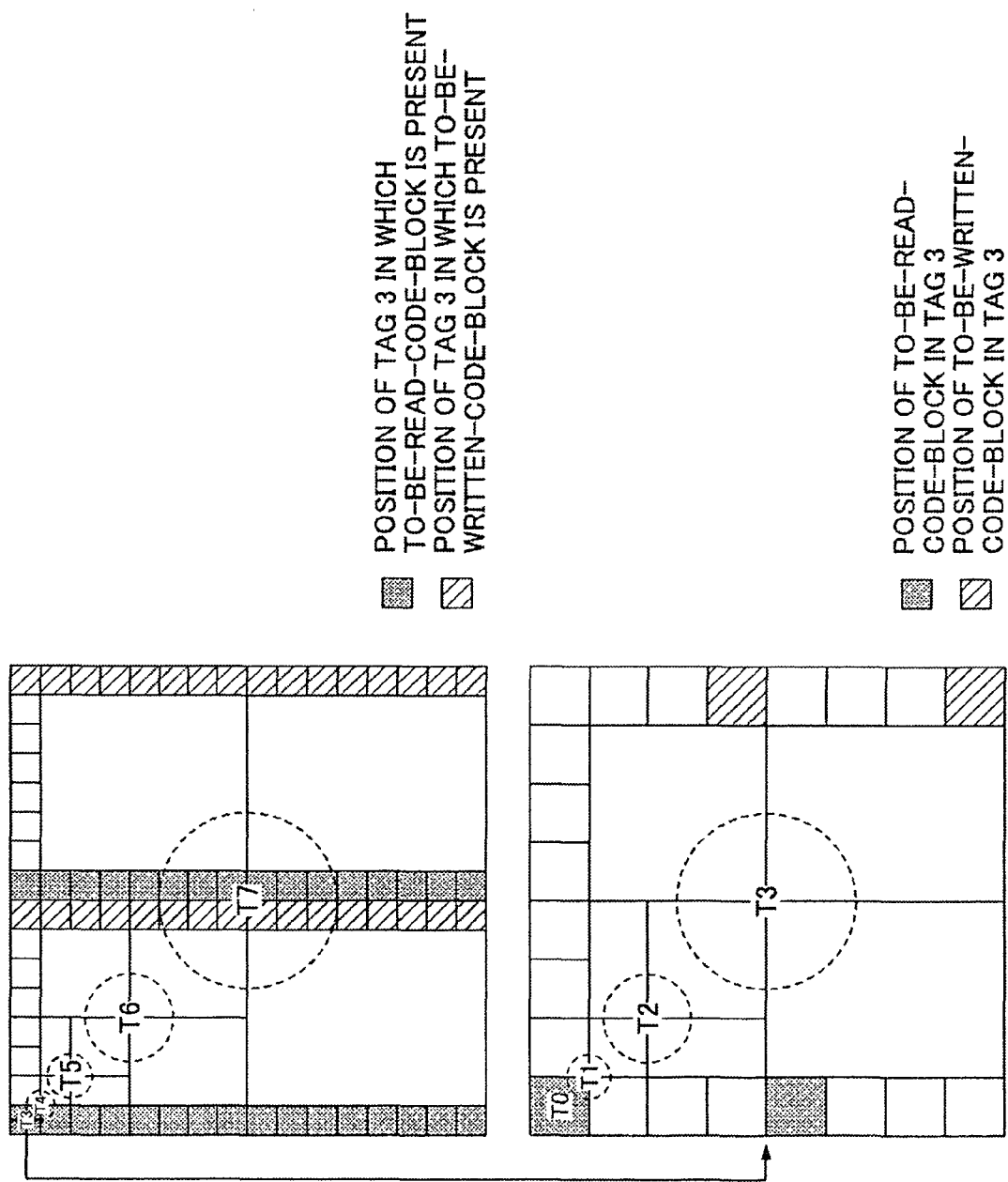
FIG. 18 is a diagram for explaining controlling loading of zero bit-plane information.

FIGS. 18 and 19 are diagrams for explaining controlling loading of zero bit-plane information. Unlike the code-block inclusion information item and the zero bit-plane inclusion information item, a zero bit-plane information item is represented by multiple bits. Hence, the number of access times to the external memory is greater than in the case of code-block inclusion information items and zero bit-plane inclusion information items. However, the access to the external memory may be controlled based on the capacity of the internal buffer and the code-blocks to be processed, so that the frequency of the access to the external memory can be reduced compared to accessing the code-blocks individually. Thus the overall processing speed is improved.

FIG. 19 is an example of a description in a hardware description language for realizing the operations of FIG. 18. According to the expression (5) of FIG. 19, if the value of matwzn3 is not 0, then writing into the external memory is performed. According to the expression (6), if the value of matrzn3 is not 0, then reading from the external memory is performed. In the expressions (5) and (6), bn_znm represents the address of a zero bit-plane information item of a tag level m in the internal buffer. The definitions of other variables are the same as those of the expressions (1) and (2).

(Example of Controlling the Timing for Reading from the External Memory Based on a Memory Access List)

Figure 20:
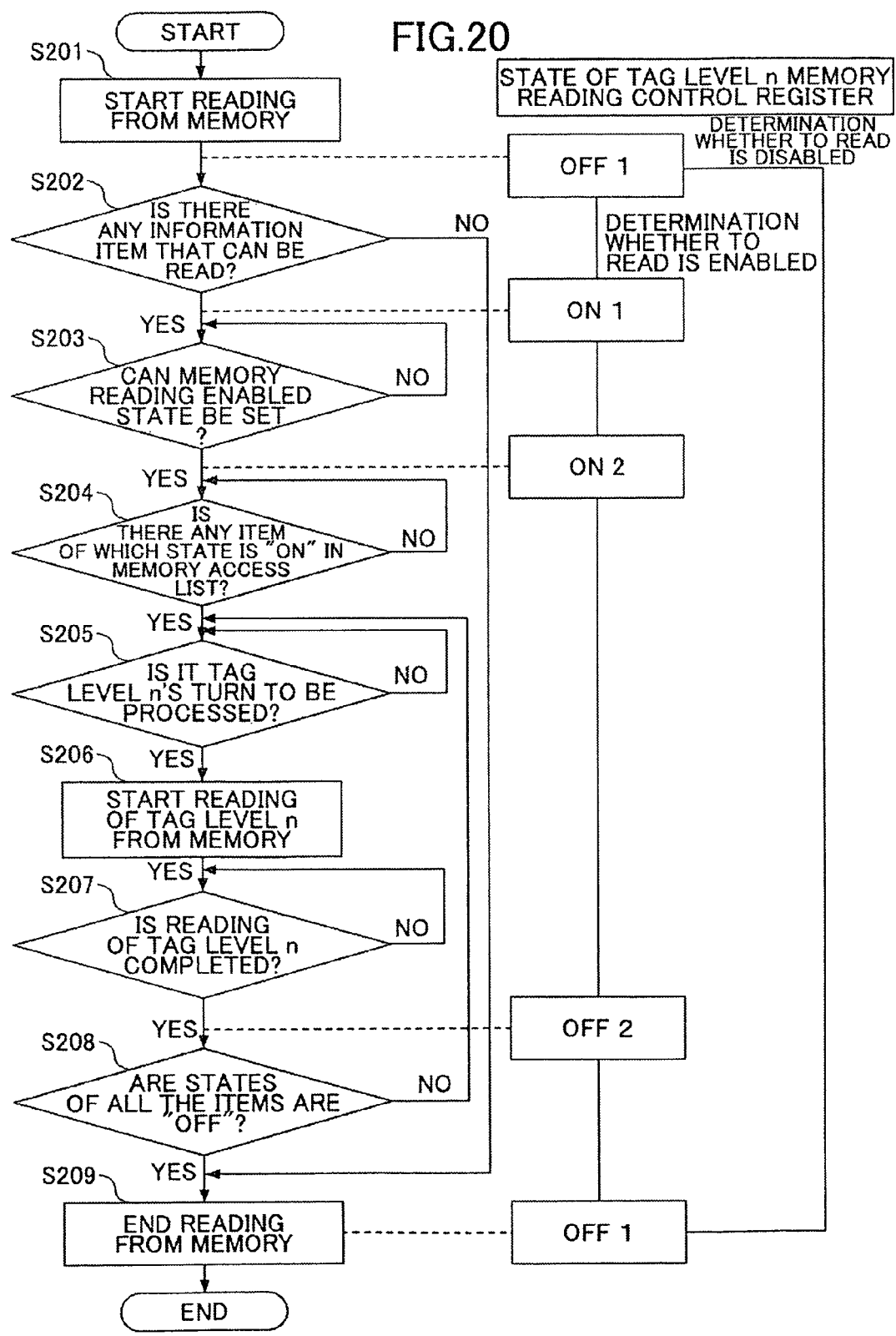
FIG. 20 is a flowchart illustrating the process of controlling the timing for reading from an external memory based on a memory access list.

FIG. 20 is a flowchart illustrating the process of controlling the timing for reading from the external memory based on a memory access list. The memory access list controls the access to the external memory during a processing period of a code-block and determines which tag tree information item of which tag level is required during the processing period.

For example, in the case of processing q0 (0,0) in FIG. 7, tag tree information items of all the parent nodes, namely, q1 (0,0) through q3 (0,0), need to be read. However, the parent nodes of q0 (1,0) in the tag levels 1 through 3 are the same as those of q0 (0,0), so only a tag tree information item of q0 (1,0) needs to be read.

In FIG. 20, the storage control unit 244 sets a value in the register 245 based on the memory access list, thereby controlling reading tag tree information items required for processing a code-block. The register 245 may be configured as a toggle register. A toggle register holds a value of a predetermined bit length and increments the value by 1 upon every input. When the value becomes the maximum value in the bit length, the value is reset to the minimum value in the bit length.

In Step S201, the not shown control unit starts determination whether to perform reading from the external memory during a processing period of the code-block currently being processed. The value of the register 245 is set to "OFF 1" by the storage control unit 244. Then in Step S202, if the storage control unit 244 determines that tag tree information items to be read are present according to the control of the timing for reading from the external memory described with reference to FIGS. 14-19, the storage control unit 244 sets the value of the register 245 to "ON 1". Then the process proceeds to Step S203. If there are no tag tree information items to be read, the process proceeds to Step S209.

In Step S203, the storage control unit 244 determines whether the reading can be enabled. If the reading can be enabled, the storage control unit 244 sets the value of the register to "ON 2". Then the process proceeds to Step S204. If the reading cannot be enabled, Step S203 is repeated.

In Step S204 the storage control unit 244 determines a tag level to be read for each code-block to be processed based on the memory access list. If there is a tag level to be read, the process proceeds to Step S205. If there is no tag level to be read, Step S204 is repeated.

In Step S205 the storage control unit 244 determines whether it is the tag level n's turn to be processed. Step S205 is repeated until it is the tag level n's turn. If the tag level n's turn comes, the process proceeds to Step S206.

In Step S206 the storage control unit 244 reads a tag tree information item of the tag level n from the first storage unit 290. Then in Step S207 the storage control unit 244 determines whether the reading of the tag level n is completed. If not, the reading is continued. If completed, the storage control unit 244 sets the value of the register to "OFF 2". Then the process proceeds to Step S208.

In Step S209, the not shown control unit ends the determination whether to perform reading from the external memory during the processing period of the code-block currently being processed.

(Example of Controlling the Timing for Writing into the External Memory Based on a Memory Access List)

Figure 21:
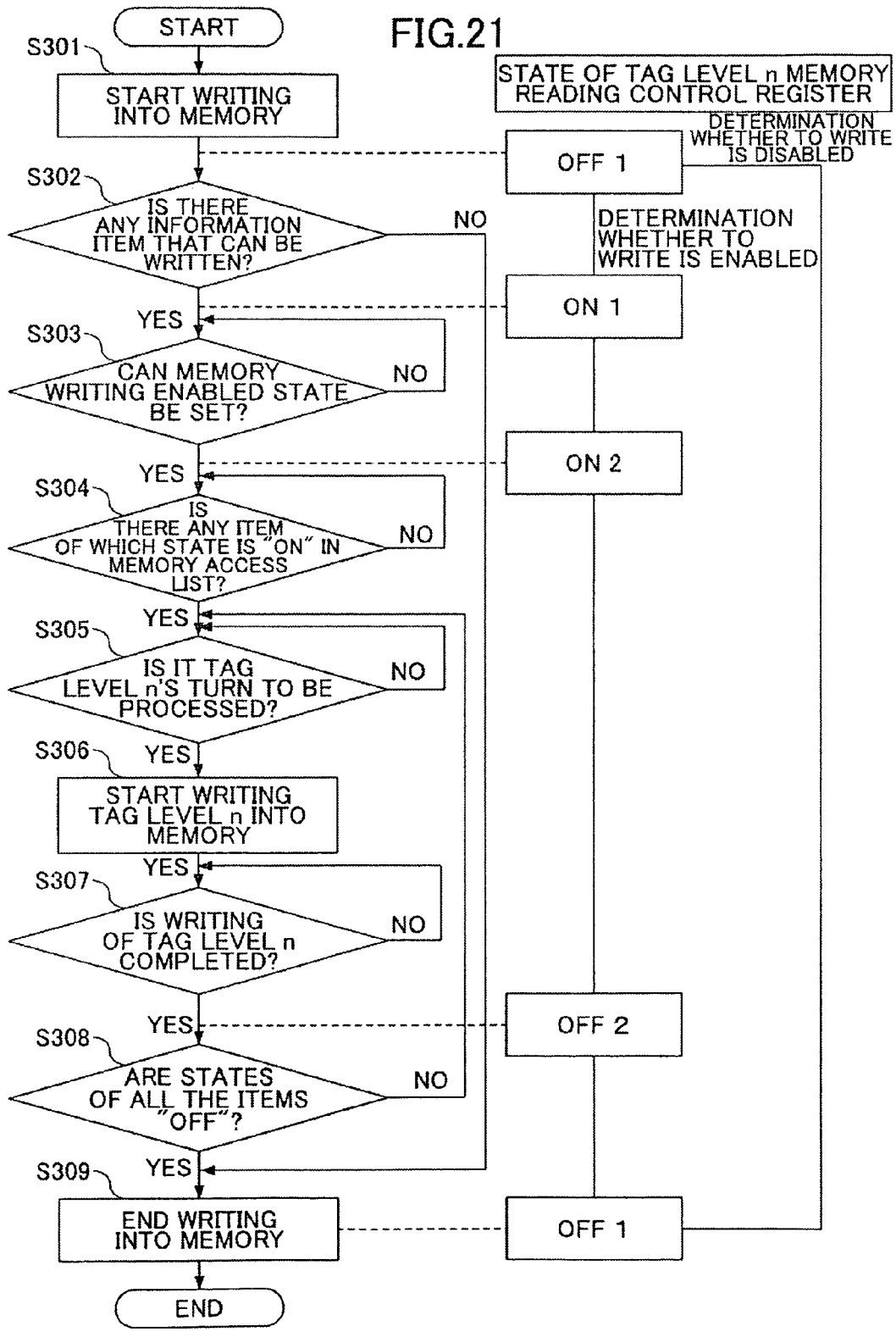
FIG. 21 is a flowchart illustrating the process of controlling the timing for writing into an external memory based on a memory access list.

FIG. 21 is a flowchart illustrating the process of controlling the timing for writing into the external memory. In FIG. 20, an operation of reading from the external memory is performed according to the results of predetermined determinations. In FIG. 21, an operation of writing into the external memory is performed is according to the results of predetermined determinations. The operation in FIG. 21 uses the same criteria for determinations as the operation in FIG. 20. Therefore, the flow shown in FIG. 21 can be easily understood from the description of the flow shown in FIG. 20 and is not described herein.

(Advantageous Effects of the Embodiments of the Present Invention)

The advantageous effects of the above described embodiments are described below.

FIG. 22 is a diagram for explaining data, wherein the image size of the original image is 8192 pixels by 8192 pixels; the number of resolution levels resulting from sub-band decompositions is 8; and the code-block size is 32. A tag tree inclusion information item of a code-block is 1 bit; a zero bit-plane inclusion information item is 1 bit; and a zero bit-plane information item is 4 bits.

(A) Capacity of the Internal Buffer and the Number of Times Accessing the External Memory in the Case of the Tag Tree Information Batch Read/Write Method If no precinct partitioning is used, the capacity required for analyzing tag tree inclusion information items of code-blocks is 16384 bits. The capacity required for analyzing zero bit-plane inclusion information items and zero bit-plane information items is added to it, making the total 98304 bits.

In the case where there is one layer and a 32-bit wide bus is used, the number of access times for reading these information items is as follows.

The number of access times for code-blocks of all the sub-bands of each resolution level is (1+(1+1+2+8+32+128+512)×3)=2053 times for tag tree inclusion information items; (1+(1+1+2+8+32−1128+512)×3)=2053 for zero bit-plane inclusion information items; and (1+(1+2+8+32+128+512+2048)×3)=8194 for zero bit-plane information items; making the total 12300 times. If there are 3 different color components, the number of access times becomes 36900. Further, if there are two or more layers, the number of access times is 36900×N, wherein N is the number of layers.

If precinct partitioning is used, information of all the sub-bands of each resolution level of each color component are required, and the capacity required of the internal buffer required for analyzing the tag tree information inclusion items of code-blocks is 65535 bits. The capacity of the internal buffer required for zero bit-plane inclusion information items and zero bit-plane information items is added to it, making the total 393210 bits.

(B) Capacity of the Internal Buffer and the Number of Times Accessing the External Memory in the Case of the Tag Tree Information Ad-Hoc Read/Write Method The capacity of the internal buffer capacity required for processing on a per resolution level basis is 1×8=8 bits for code-block inclusion information items, 1×8=8 bits for zero bit-plane inclusion information items, and 4×8=32 bits for zero bit-plane information items, making the total 48 bits. That is, compared with the required buffer size in the case of the tag tree information batch read/write method, the required buffer size is 1/2048 when no precinct partitioning is used and 1/8192 when precinct partitioning is used.

On the other hand, the number of access times for one code-block is, in the case where there is one layer, 8×2=6 times for reading/writing tag tree inclusion information items, 8×2=16 times for reading/writing zero bit-plane inclusion information items; and 3×2=16 times for reading/writing zero bit-plane information items, making the total 48 times.

The number of access times for all the code-blocks in each sub-band of each resolution level is (1+(1+4+16+64+256+1024+4096+16384)×3)×16=1048576 times. Further, if there are three different color components, a total of 3145728 times of access to the external memory are required. That is, the number of accesses is increased approximately 85 times the number of accesses in the case of the tag tree information batch read/write method.

(C) Capacity of the Internal Buffer and the Number of Times Accessing the External Memory in the Embodiment of the Present Invention The capacity required for storing code-block inclusion information items is 1+4+16+32+32+32+32+32=181 bits, which is the sum of 8 tag levels from the tag level 7 to the tag level 0. The capacity required for analyzing zero bit-plane inclusion information items and zero bit-plane information items is added to it, making the total 1086 bits.

In the case where there is one layer and a 32-bit wide bus is used, the number of times accessing the external memory is 1+(1+1+1+2+8+32+128+512)×3)×2=4112 times for reading/writing code-block inclusion information items, (1+(1+1+1+2+8+32+128+51.2)×3)×2=4112 times for reading/writing zero bit-plane inclusion information items, and (1+(1+1+2+8+32+128+512+1024)×3)×2=10250 times for reading/writing zero bit-plane information items; making the total 18474 times. If there are 3 different color components, the number of access times is in total 55422.

The required size of the internal buffer of the case (C) is reduced to approximately 1/90 through 1/362 of the required size of case (A) of the tag tree information batch read/write method. The number of accesses to the external memory is approximately 1.5 times greater.

The required size of the internal buffer of the case (C) is 1086 bits, which is greater than 6 bits of the case (B) of the tag tree information ad-hoc read/write method. However, the number of accesses of the case (B) is 314572, and the number of accesses of the case (C) is 54222, which is approximately 1/56 of the case (B).

If the size of the internal buffer is changed, the number of times accessing the external memory is changed. Accordingly, a system may be properly configured according to its specification using an embodiment of the present invention.

While the present invention has been described in terms of preferred embodiments, it will be apparent to those skilled in the art that variations and modifications may be made without departing from the scope of the invention.

The present application is based on Japanese Priority Application No. 2007-123633 filed on May 8, 2007, with the Japanese Patent Office, the entire contents of which are hereby incorporated by reference.

What is claimed is:

1. An image processing apparatus for generating code data, the image processing apparatus comprising:
   a wavelet transform circuit configured to divide an image into code-blocks of different levels by a wavelet transform;
   a code generating circuit configured to generate information codes of code-block-related information items related to the code-blocks of the different levels using separate tag trees corresponding to the different levels;
   a coordinate generating circuit configured to generate an x coordinate and a y coordinate of each of the code-blocks of each of the levels wherein a unit in an x direction and in a y direction is defined by a size of the individual code-blocks of the corresponding level; and
   an address generating circuit configured to generate a multiple of a combination value of a bit combination of the y coordinate and the x coordinate of each code-block as an address for storing the information code of the code-block in a first storage circuit; and
   wherein the multiple of the combination value is calculated by multiplying the combination value by a maximum bit length of the information code for each of the different information codes.

2. An image processing apparatus for generating an image, the image processing apparatus comprising:
   a wavelet transform circuit configured to divide the image into code-blocks of different levels by a wavelet transform;
   a code generating circuit configured to generate information codes of code-block-related information items related to the code-blocks of the different levels using separate tag trees corresponding to the different levels;
   a coordinate generating circuit configured to generate an x coordinate and a y coordinate of each of the code-blocks of each of the levels wherein a unit in an x direction and in a y direction is defined by a size of the individual code-blocks of the corresponding level;
   an address generating circuit configured to generate a multiple of a combination value of a bit combination of the y coordinate and the x coordinate of each code-block as an address for storing the information code of the code-block in a first storage circuit; and
   an image generating circuit configured to generate the image by decoding the information codes; and
   wherein the multiple of the combination value is calculated by multiplying the combination value by a maximum bit length of the information code for each of the different information codes.

3. The image processing apparatus as claimed in claim 1, wherein, in the case of performing residing and/or writing a first predetermined number of consecutive bits at a time, the address generating circuit uses values of higher order bits of the multiple of the combination value from which the same number of lower order bits as the number of the first predetermined number of consecutive bits are removed as an offset value for reading the information code from or writing the information code into the first storage circuit.

4. The image processing apparatus as claimed in claim 3, wherein the address generating circuit generates a second predetermined number of lower order bits of the multiple of the combination value as an address of the information code in a second storage circuit that has a lower capacity than the first storage circuit.

5. The image processing apparatus as claimed in claim 4, wherein the first predetermined number is the same number as the second predetermined number.

6. The image processing apparatus as claimed in claim 4, further comprising: a storage control circuit that, when the address of the information code in the second storage circuit has a first predetermined value, reads the information code from the first storage circuit and writes the information code into the second storage circuit and, when the address of the information code in the second storage circuit has a second predetermined value, reads the information code from the second storage circuit and writes the information code into the first storage circuit.

7. The image processing apparatus as claimed in claim 4, wherein the first storage circuit is disposed outside the image processing apparatus; and wherein the second storage circuit is disposed inside the image processing apparatus.

8. The image processing apparatus as claimed in claim 1, wherein the tag tree includes plural different tag levels; and wherein a first of the code-blocks in a first of the tag levels is a parent node of a maximum of two of the code-blocks in the x direction and a maximum of two of the code-blocks in the y direction in a second of the tag levels immediately below the first tag level.

9. The image processing apparatus as claimed in claim 1, wherein the code data conform to the JPEG 2000 standard; and wherein the code-block-related information item includes a code-block inclusion information item or zero bit-plane information item.

10. An image processing circuit for generating code data, the image processing circuit comprising:

a wavelet transform circuit configured to divide an image into code-blocks of different levels by a wavelet transform;

a code generating circuit configured to generate information codes of code-block-related information items related to the code-blocks of the different levels using separate tag trees corresponding to the different levels;

a coordinate generating circuit configured to generate an x coordinate and a y coordinate of each of the code-blocks of each of the levels wherein a unit in an x direction and in a y direction is defined by a size of the individual code-blocks of the corresponding level; and an address generating circuit configured to generate a multiple of a combination value of a bit combination of the y coordinate and the x coordinate of each code-block as an address for storing the information code of the code-block in a first storage circuit; and wherein the multiple of the combination value is calculated by multiplying the combination value by a maximum bit length of the information code for each of the different information codes.

11. An image processing circuit for generating an image, the image processing circuit comprising:

a wavelet transform circuit configured to divide the image into code-blocks of different levels by a wavelet transform;

a code generating circuit configured to generate information codes of code-block-related information items related to the code-blocks of the different levels using separate tag trees corresponding to the different levels;

a coordinate generating circuit configured to generate an x coordinate and a y coordinate of each of the code-blocks of each of the levels wherein a unit in an x direction and in a y direction is defined by a size of the individual code-blocks of the corresponding level;

an address generating circuit configured to generate a multiple of a combination value of a bit combination of the y coordinate and the x coordinate of each code-block as an address for storing the information code of the code-block in a first storage circuit; and an image generating circuit configured to generate the image by decoding the information codes: and wherein the multiple of the combination value is calculated by multiplying the combination value by a maximum bit length of the information code for each of the different information codes.

12. The image processing circuit as claimed in claim 10, wherein, in the case of performing reading and/or writing a first predetermined number of consecutive bits at a time, the address generating circuit generates a second predetermined number of lower order bits of the multiple of the combination value as an address of the information code in a second storage circuit that has a lower capacity than the first storage circuit.

13. The image processing circuit as claimed in claim 12, further comprising: a storage control circuit that, when the address of the information code in the second storage circuit has a first predetermined value, reads the information code from the first storage circuit and writes the information code into the second storage circuit and, when the address of the information code in the second storage circuit has a second predetermined value, reads the information code from the second storage circuit and writes the information code into the first storage circuit.

14. The image processing circuit as claimed in claim 13, wherein the tag tree includes plural different tag levels; wherein a toggle register is provided one for each of the tag levels; and wherein, if a value of the toggle register is a predetermined value, the storage control circuit reads out the information code of the corresponding tag level from the first storage circuit and loads the read information code into the second storage circuit and updates the value of the toggle register.

15. An image processing method for generating code data, the image processing method comprising:

dividing an image into code-blocks of different levels by a wavelet transform;

generating information codes of code-block-related information items related to the code-blocks of the different levels using separate tag treys corresponding to the different levels;

generating an x coordinate and a y coordinate of each of the code-blocks of each of the levels wherein a unit in an x direction and in a y direction is defined by a size of the individual code-blocks of the corresponding level; and generating a multiple of a combination value of a bit combination of the y coordinate and the x coordinate of each code-block as an address for storing the information code of the code-block in a first storage circuit; and wherein the multiple of the combination value is calculated by multiplying the combination value by a maximum bit length of the information code for each of the different information codes.

16. An image processing method for generating an image, the image processing method comprising:

dividing an image into code-blocks of different levels by a wavelet transform;

generating information codes of code-block-related information items related to the code-blocks of the different levels using separate tag trees corresponding to the different levels;

generating an x coordinate and a y coordinate of each of the code-blocks of each of the levels wherein a unit in an x direction and in a y direction is defined by a size of the individual code-blocks of the corresponding level;

generating a multiple of a combination value of a bit combination of the y coordinate and the x coordinate of each code-block as an address for storing the information code of the code-block in a first storage circuit and generating the image by decoding the information codes; and wherein the multiple of the combination value is calculated by multiplying the combination value by a maximum bit length of the information code for each of the different information codes.

17. The image processing method as claimed in claim 15, wherein, in a case of performing reading and/or writing a first predetermined number of consecutive bits at time, values of higher order bits of the multiple of the combination value from which the same number of lower order bits as the number of the first predetermined number of consecutive bits are removed are used as an offset value for reading the information code from or writing the information code into the first storage circuit.

18. The image processing method as claimed in claim 15, wherein, in the address generating step, a second predetermined number of lower order bits of the multiple of the combination value are generated as an address of the information code in a second storage circuit that has a lower capacity than the first storage circuit.

19. The image processing method as claimed in claim 18, further comprising: reading the information code from the first storage circuit and writing the information code into the second storage circuit when the address of the information code in the second storage circuit has a first predetermined value; and reading the information code from the second storage circuit and writing the information code into the first storage circuit when the address of the information code in the second storage circuit has a second predetermined value.

* * * * *